United States Patent
Smith et al.

(10) Patent No.: US 10,735,450 B2
(45) Date of Patent: Aug. 4, 2020

(54) TRUST TOPOLOGY SELECTION FOR DISTRIBUTED TRANSACTION PROCESSING IN COMPUTING ENVIRONMENTS

(71) Applicant: Intel Corporation, Santa Clara, CA (US)

(72) Inventors: Ned Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 15/827,952

(22) Filed: Nov. 30, 2017

(65) Prior Publication Data
US 2019/0036957 A1    Jan. 31, 2019

(51) Int. Cl.
*H04L 29/06* (2006.01)
*G06F 9/46* (2006.01)
(Continued)

(52) U.S. Cl.
CPC .......... *H04L 63/1433* (2013.01); *G06F 9/466* (2013.01); *G06F 21/6218* (2013.01);
(Continued)

(58) Field of Classification Search
CPC . H04L 63/1433; H04L 63/101; H04L 9/3239; H04L 9/0643; H04L 2209/38; G06F 21/6218; G06F 9/466
See application file for complete search history.

(56) References Cited

U.S. PATENT DOCUMENTS

2016/0342976 A1\* 11/2016 Davis .................. G06Q 20/065
2017/0178072 A1    6/2017 Poomachandran et al.
(Continued)

FOREIGN PATENT DOCUMENTS

WO        2015116998         8/2015

OTHER PUBLICATIONS

Peck, "Blockchains: How They Work and Why They'll Change the World," IEEE Spectrum, Sep. 28, 2017, 8 pages.
(Continued)

*Primary Examiner* — Nelson S. Giddins
(74) *Attorney, Agent, or Firm* — Hanley, Flight & Zimmerman, LLC

(57) ABSTRACT

Example methods, apparatus, systems and articles of manufacture (e.g., non-transitory physical storage media) to provide trust topology selection for distributed transaction processing in computing environments are disclosed herein. Example distributed transaction processing nodes disclosed herein include a distributed transaction application to process a transaction in a computing environment based on at least one of a centralized trust topology or a diffuse trust topology. Disclosed example distributed transaction processing nodes also include a trusted execution environment to protect first data associated with a centralized trust topology and to protect second data associated with a diffuse trust topology. Disclosed example distributed transaction processing nodes further include a trust topology selector to selectively configure the distributed transaction application to use the at least one of the centralized trust topology or the diffuse trust topology to process the transaction.

28 Claims, 11 Drawing Sheets

(51) Int. Cl.
  *G06F 21/62*  (2013.01)
  *G06F 21/64*  (2013.01)
  *H04L 9/06*  (2006.01)
  *H04L 9/32*  (2006.01)

(52) U.S. Cl.
  CPC ............ *G06F 21/64* (2013.01); *H04L 9/0643* (2013.01); *H04L 9/3239* (2013.01); *H04L 63/101* (2013.01); *H04L 2209/38* (2013.01)

(56) References Cited

U.S. PATENT DOCUMENTS

| | | |
|---|---|---|
| 2017/0236120 A1 | 8/2017 | Herlihy et al. |
| 2017/0310747 A1 | 10/2017 | Cohn et al. |
| 2017/0323392 A1* | 11/2017 | Kasper .................. G06Q 40/12 |
| 2018/0330125 A1* | 11/2018 | Gray ....................... G06F 21/72 |
| 2019/0156301 A1* | 5/2019 | Bentov ................ G06Q 20/027 |

OTHER PUBLICATIONS

International Searching Authority, "International Search Report," mailed in connection with International Patent Application No. PCT/US2018/058253, dated Feb. 12, 2019, 3 pages.

International Searching Authority, "Written Opinion," mailed in connection with International Patent Application No. PCT/US2018/058253, dated Feb. 12, 2019, 4 pages.

International Bureau, "International Preliminary Report on Patentability," mailed in connection with International Patent Application No. PCT/US2018/058253, dated Jun. 2, 2020, 5 pages.

* cited by examiner

TRUST TOPOLOGY SELECTION FOR DISTRIBUTED TRANSACTION PROCESSING IN COMPUTING ENVIRONMENTS

FIELD OF THE DISCLOSURE

This disclosure relates generally to transaction processing in computing environments and, more particularly, to trust topology selection for distributed transaction processing in computing environments.

BACKGROUND

Distributed trust topologies are employed in computing environments to enable distributed transaction applications executing on processing nodes in a given computing environment to process (e.g., clear) transactions among entities. Two types of distributed trust topologies are centralized trust topologies and diffuse trust topologies (also referred to as decentralized trust topologies). In a centralized trust topology, transaction processing is distributed but trust management is centralized in a trust authority. The centralized trust authority provisions whitelist information and enforces whitelist compliance to enable the processing nodes in the computing environment to trust each other. Thus, in a centralized trust topology, transaction processing can be performed quickly by checking the whitelists to ensure transactions are being performed by trusted entities. In contrast, in a diffuse trust topology, the processing nodes in the computing environment are assumed to be untrusted and there is no centralized trust authority. Rather, in a diffuse trust topology, trust is achieved through consensus, which typically limits the rate at which transactions can be processed and, thus, results in slower transaction processing throughput than a centralized trust topology. However, centralized trust topologies can be more vulnerable to being compromised than diffuse trust topologies due to the centralized trust topologies having a single potential point-of-failure, namely, the centralized trust authority.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
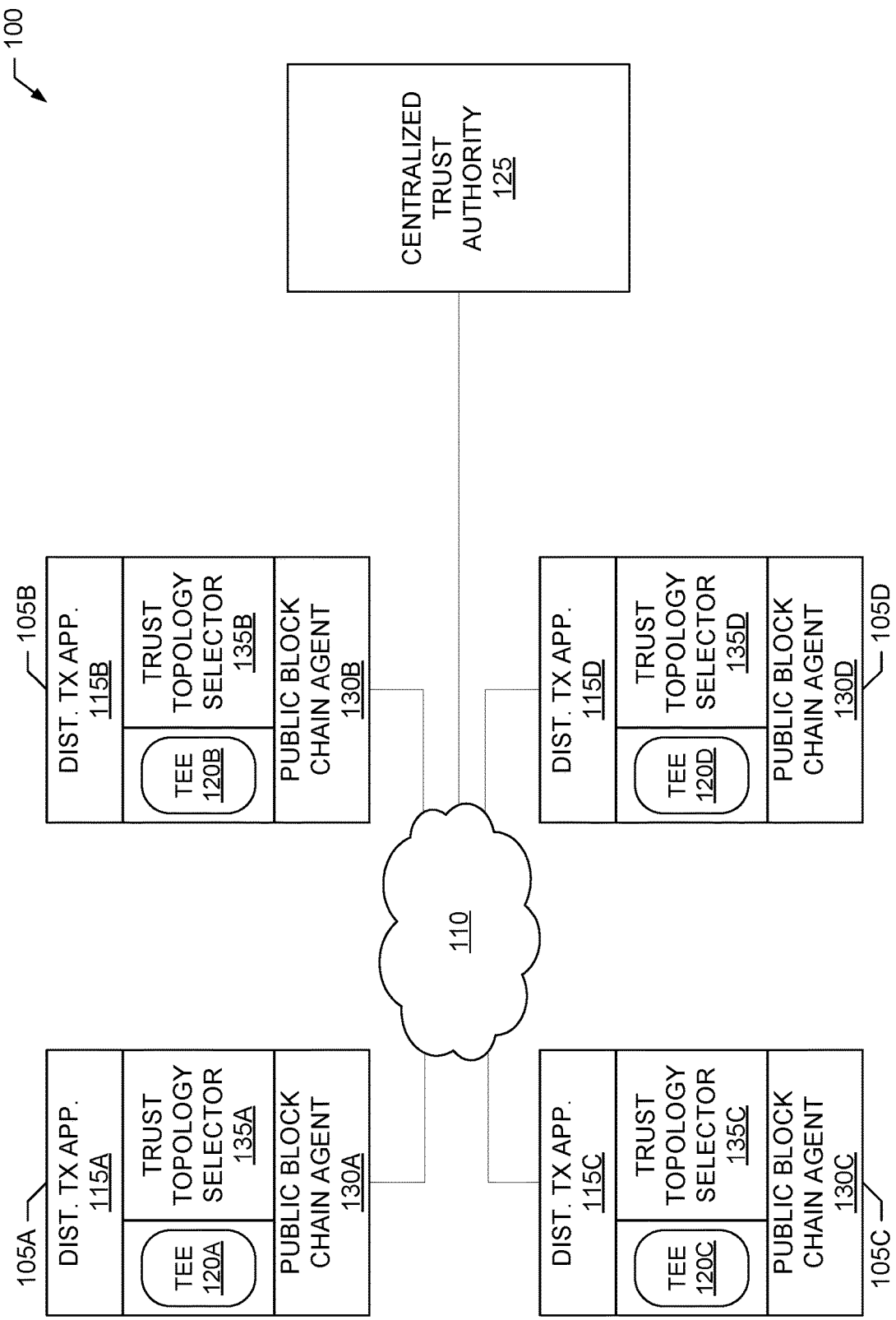
FIG. 1 is a block diagram of an example computing environment including example processing nodes implementing trust topology selection for distributed transaction processing in accordance with the teachings of this disclosure.

Example methods, apparatus, systems and articles of manufacture (e.g., non-transitory physical storage media) to provide trust topology selection for distributed transaction processing in computing environments are disclosed herein. Example distributed transaction processing nodes disclosed herein include a distributed transaction application to process a transaction in a computing environment based on at least one of a centralized trust topology or a diffuse trust topology. Disclosed example distributed transaction processing nodes also include a trusted execution environment to protect first data associated with a centralized trust topology and to protect second data associated with a diffuse trust topology. Disclosed example distributed transaction processing nodes further include a trust topology selector to selectively configure the distributed transaction application to use the at least one of the centralized trust topology or the diffuse trust topology to process the transaction.

In some disclosed example distributed transaction processing nodes, the trust topology selector includes a transaction migrator to determine a first trust value associated with the centralized trust topology and to determine a second trust value associated with the diffuse trust topology. In some disclosed examples, the transaction migrator also is to determine whether the distributed transaction application is to use at least one of the centralized trust topology or the diffuse trust topology based on the first trust value and the second trust value. For example, the transaction migrator can configure the distributed transaction application to use the centralized trust topology when the first trust value exceeds the second trust value (and/or when a trust threshold value is exceeded by the first trust value, which may be derived from a first blockchain risk assessment), but can configure the distributed transaction application to use the diffuse trust topology when the second trust value exceeds the first trust value (and/or when the trust threshold value is exceeded by the second trust value, which may be derived from a second blockchain risk assessment). Furthermore, in some disclosed examples, when the first trust value matches the second trust value, the transaction migrator can configure the distributed transaction application to use the centralized trust topology when a first quality of service value associated with the centralized trust topology exceeds a second quality of service value associated with the diffuse trust topology, but can configure the distributed transaction application to use the diffuse trust topology when the second quality of service value associated with the diffuse trust topology exceeds the first quality of service value associated with the centralized trust topology.

Additionally or alternatively, in some disclosed example distributed transaction processing nodes, the trust topology selector includes a trust threshold analyzer to monitor telemetry data associated with operation of the distributed transaction processing node to determine whether to isolate the distributed transaction processing node from the centralized trust topology. In some disclosed examples, the trust threshold analyzer also is to configure the distributed transaction application to use the diffuse trust topology in response to determining that the distributed transaction processing node is to be isolated from the centralized trust topology.

Additionally or alternatively, in some disclosed example distributed transaction processing nodes, the trust topology selector includes an attestation verifier to perform peer attestations with other distributed transaction processing nodes based on a whitelist provided by a centralized trust authority. In some disclosed examples, the attestation verifier also is to report results of the peer attestations to a blockchain associated with the diffuse trust topology to determine whether the distributed transaction processing node is to be isolated from the centralized trust topology.

Additionally or alternatively, in some disclosed examples, the first data protected by the trusted execution environment includes first cryptographic key data associated with the centralized trust topology, and the second data protected by the trusted execution environment includes second cryptographic key data and blockchain data associated with the diffuse trust topology.

These and other example methods, apparatus, systems and articles of manufacture (e.g., non-transitory physical storage media) to provide trust topology selection for distributed transaction processing in computing environments are disclosed in further detail below.

As noted above, distributed transaction applications executing on processing nodes in a computing environment employ distributed trust topologies to process transactions among entities. For example, such transaction processing may involve clearing a transaction between an originator and a recipient, which may include receiving or otherwise detecting a transaction request, aggregating transaction requests, validating the transactions and storing the transaction in a digital ledger, such as a blockchain. Two types of distributed trust topologies are centralized trust topologies and diffuse trust topologies. Examples of centralized trust topologies include, but are not limited to, practical byzantine fault tolerance (PBFT) topologies, permissioned ledger topologies, etc. Examples of diffuse trust topologies include distributed consensus algorithm (DCA) topologies, such as Bitcoin's blockchain topology, Ethereum's blockchain topology, etc.

Both centralized trust topologies and diffuse trust topologies can be based on blockchains to manage transactions among entities in the computing environment. In general, a blockchain includes a sequence of data blocks representing a history of transactions in the computing environment. Each data block stores data for a set of transaction records that have been aggregated into that block. The transaction records in a block are validated cryptographically using cryptographic keys. Furthermore, to thwart tampering, when appending a new block to the end of the blockchain, contents of a prior block are combined with the contents of the new block (e.g., via hashing) to link the new block with the prior block. Any attempt to later tamper with the new block will also require tampering with the prior block, and so on, to ensure that the combined (e.g., hashed) data is correct. Such tampering can become prohibitively expensive as the length of the blockchain increases.

As noted above, in a centralized trust topology such as PBFT, transaction processing is distributed but trust management is centralized in a centralized trust authority that provisions whitelist information and enforces whitelist compliance to enable the processing nodes in the computing environment to trust each other. For example, the centralized trust authority can provision a whitelist to processing nodes participating in the centralized trust topology. In some examples, the whitelist identifies valid (and invalid) processing nodes that may be trusted (or not trusted) in the centralized trust topology, as well as whitelist measurements that processing nodes (e.g., peers) in the topology are to use to perform peer attestations/verifications. In this way, the centralized trust topology restricts blockchain access to only trusted processing nodes. Because access is restricted to trusted participants, centralized trust topologies can use relatively simple validation procedures to add transactions to the blockchain, thereby supporting a high transaction processing throughput (e.g., a high rate of clearing transactions.) A centralized trust topology may also rely on the processing nodes each implementing a trusted execution environment (TEE) to, for example, store the cryptographic keys, whitelist, etc., governing access to and/or processing of data to be read from and/or written to the private blockchain of the centralized trust topology.

In contrast, in a diffuse trust topology such as DCA, transaction processing is distributed and trust management is decentralized. In general, a diffuse trust topology assumes blockchain access is unrestricted and the processing nodes participating in the topology are untrusted. To establish trust, the diffuse trust topology employs relatively complex validation procedures that effectively involve a processing node offering proof that a data block to be added to the blockchain is valid. Examples of such proof includes proof-of-work (e.g., as used in the Bitcoin topology), proof-of-waiting, proof-of-stake, etc. Furthermore, the validation procedures rely on a consensus being reached among a majority (or supermajority) of the processing nodes that the block being added to the public blockchain is valid. Due to the complexity of the validation procedures, transaction processing throughput in a diffuse trust topology can be limited. For example, in the Bitcoin topology, transaction processing is currently limited to about 1 new transaction block every 10 minutes. Furthermore, to improve trust, diffuse trust topologies rely on larger and larger numbers of processing nodes being included in the topology, but the cost to process transaction blocks may increase nonlinearly as the number of processing nodes in the topology increases.

Thus, there are tradeoffs between using a centralized trust topology vs. a diffuse trust topology for distributed transaction processing in a computing environment. For example, a centralized trust topology can offer greater transaction processing throughput than a diffuse trust topology because a centralized trust authority grants permission to the blockchain and ensures trust among the processing nodes, which allows the centralized trust topology to use simpler/faster blockchain validation procedures than can be used by a diffuse trust topology. However, the centralized trust topology can be more vulnerable than the diffuse trust topology to being compromised as the centralized trust topology is subject to a single point-of-failure, the centralized trust authority. In contrast, a majority of processing nodes may need to fail or be compromised before trust is compromised in the diffuse trust topology.

Prior distributed transaction processing solutions are limited in that they are constructed to use one type of trust topology. For example, some prior distributed transaction processing solutions employ centralized trust topologies and, thus, can provide high transaction processing throughout at the expense of a single point of vulnerability. Other prior distributed transaction processing solutions allow processing nodes to be untrusted without exposing a single point of vulnerability, but at the expense of lower transaction processing throughput. However, users (e.g., merchants, bankers, etc.) would benefit from the flexibility of being able to select (e.g., dynamically) the type of trust topology that suits a given transaction, a given state of the node processing the transaction, a given state of the computing environment, etc.

Example distributed transaction processing solutions disclosed herein employ trust topology selection to overcome the drawbacks of these prior solutions and provide the flexibility users desire. For example, disclosed example distributed transaction processing solutions enable a processing node in a computing environment to support both centralized trust topology and a diffuse trust topology, along with techniques for selecting which trust topology is to be used to process a transaction. As disclosed in further detail below, example trust topology selection techniques implemented in accordance with the teachings of the disclosure can configure (e.g., dynamically) a distributed transaction application executing on a processing node to use either the centralized trust topology or the diffuse trust topology to process a given transaction based on comparing trust values determined for the different trust topologies, possibly along with other parameters, such as quality-of-service values, determined for the different trust topologies. Additionally or alternatively, example trust topology selection techniques implemented in accordance with the teachings of the disclosure can monitor telemetry data associated with operation of a processing node to determine whether to isolate the processing node from the centralized trust topology (e.g., because trust may have been compromised), and can configure the node's distributed transaction application to use the diffuse trust topology if the processing node is to be isolated from the centralized trust topology. Additionally or alternatively, example trust topology selection techniques implemented in accordance with the teachings of the disclosure can perform peer attestations among processing nodes based on a whitelist provided by a centralized trust authority, and can report results of the peer attestations to a blockchain associated with the diffuse trust topology. These attestation results can then be used to determine whether a given processing node is to be isolated from the centralized trust topology (e.g., because trust may have been compromised). As disclosed in further detail below, example trust topology selection techniques implemented in accordance with the teachings of the disclosure backup transaction records from the centralized blockchain of the centralized trust topology to the decentralized blockchain of the diffuse trust topology, thereby supporting switching between the centralized and diffuse trust topologies, as well as data recovery if, for example, a given processing node is removed from the centralized trust topology and is to rely on the diffuse trust topology for processing further transactions.

Turning to the figures, a block diagram of an example computing environment 100 supporting trust topology selection for distributed transaction processing in accordance with the teachings of this disclosure is illustrated in FIG. 1. The example computing environment 100 of FIG. 1. The example computing environment 100 includes example processing nodes 105A-D in communication via an example network 110. The processing nodes 105A-D include respective example distributed transaction applications 115A-D to process (e.g., clear) transactions in the computing environment 100. As such, the example processing nodes 105A-D are also referred to as example distributed transaction processing nodes 105A-D. Examples of transactions capable of being processed by the distributed transaction applications 115A-D in the computing environment 100 include, but are not limited to, remittance transaction applications, reservation transaction applications, ticketing transaction applications, etc. In the illustrated example, the processing of such transactions is considered to be distributed because the distributed transaction applications 115A-D of the processing nodes 105A-D cooperate via a trust topology (e.g., implemented with a blockchain) to validate transactions in the example computing environment 100 (e.g., rather than relying on a single entity to validate the transactions).

As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, respective ones of the processing nodes 105A-D can be implemented by any type(s) and/or number(s) of processing nodes. For example, one or more of the processing nodes 105A-D can be implemented by one or more computers, servers, virtual machines, cloud services, routing devices (e.g., such as sensor network gateways, network access points, network routers, etc.), etc., or any combination thereof. In some examples, the computing device implementing a given one of the processing nodes 105A-D can be a mobile computing platform, such as, but not limited to, a mobile phone, a tablet device, a drone, an autonomous vehicle, etc. In some examples, the computing device implementing a given one of the processing nodes 105A-D can be a device in an Internet of Things (IoT) networking arrangement, which may include, but is not limited to, a mobile computing platform (such as those described above), an electronic appliance, an embedded electronic device, a sensor, card/chip readers, etc. In some examples, one or more of the processing nodes 105A-D can be implemented by the example processing processor platform 900 of FIG. 9, which is described in further detail below. In the illustrated example of FIG. 1, the network 110 can be implemented by any type(s) and/or number(s) of networks. For example, the network 110 can be implemented by the Internet, a proprietary or otherwise closed computer network, a wireless network (e.g., a mobile cellular network, a satellite network, etc.), a sensor network, an IoT network, etc., or any combination thereof. In some examples, the network 110 can be implemented by the example network 926 of FIG. 9, which is described in further detail below.

As noted above, the processing nodes 105A-D of the illustrated example include the respective distributed transaction applications 115A-D to process (e.g., clear) transactions in the computing environment 100 using a trust topology. Moreover, each distributed transaction application 115A-D is configurable by its respective processing node 105A-D to process a transaction in a computing environment based on a centralized trust topology or a diffuse trust topology. As disclosed in further detail below, the example processing nodes 105A-D include respective example trusted execution environments 120A-D to enable the distributed transaction applications 115A-D to implement a centralized trust topology in the communication environment 100 that is managed by an example centralized trust authority 125 in communication with the processing nodes 105A-D via the network 110. Additionally, the example processing nodes 105A-D include respective example public blockchain agents 130A-D to implement a diffuse trust topology in the communication environment 100. Furthermore, the example processing nodes 105A-D include respective example trust topology selectors 135A-D to selectively configure, as disclosed in further detail below, the respective distributed transaction applications 115A-D to use the centralized trust topology or the diffuse trust topology to process transactions.

In the illustrated example of FIG. 1, the processing nodes 105A-D include the respective trusted execution environments 120A-D to protect data associated with a centralized trust topology implemented in the computing environment 100, and to protect data associated with a diffuse trust topology implemented in the computing environment 100. For example, the data protected by the trusted execution environments 120A-D for the centralized trust topology can include first cryptographic key data and blockchain data associated with a private blockchain implementing the centralized trust topology, and the data protected by the trusted execution environments 120A-D for the diffuse trust topology can include second cryptographic key data and blockchain data associated with a public blockchain implementing the diffuse trust topology. In some examples, Intel® software guard extension (SGX) technology is used to implement one or more of the trusted execution environments 120A-D.

In the illustrated example, the processing nodes 105A-D of the illustrated example use their respective distributed transaction applications 115A-D to implement a centralized trust topology based on a private blockchain that is closed and accessible to just the processing nodes 105A-D included in the centralized trust topology according to a whitelist provisioned by the example centralized trust authority 125. For example, the distributed transaction applications 115A-D can implement the private blockchain using any appropriate blockchain technology, such as, but not limited to, the Linux Foundation® Hyperledger Project and/or other distributed computing infrastructures, such as IoTivity, the OPC® Foundation Unified Architecture (UA), the Open Group Distributed Computing Environment (DCE), etc. The processing nodes 105A-D use their trusted execution environments 120A-D to protect keys used to validate transactions. In the illustrated example, the centralized topology implemented in the computing environment includes relatively few processing nodes 105A-D, which enables efficient transaction processing optimized for maximal transaction processing throughput.

In some examples, the centralized trust topology implemented by the processing nodes 105A-D in the computing environment 100 is based on practical byzantine fault tolerance (PBFT) algorithm. In such examples, the trusted execution environments 120A-D are used to protect the cryptographic keys and execution of the PBFT algorithm. In some examples, the centralized trust authority 125 may use, for example, a whitelisting mechanism to assess and establish a trust rating or score, which determines which whitelist measurements are acceptable. As a consequence of a trust rating that is deemed undesirable, either by a policy or by some other way, the centralized trust authority 125 may react to untrustworthy nodes by isolating those nodes determined to be out of compliance with the whitelist. For example, with reference to FIG. 2, the centralized trust authority 125 provisions (represented by the directed lines 205-220) a whitelist to the processing nodes 105A-D. In such examples, the trusted execution environments 120A-D provides a secure area where whitelists are stored and evaluated by the processing nodes 105A-D, and where access by the centralized trust authority 125 is verified. Also, use of whitelists is just one of several possible trust establishment strategies. Others trust establishment strategies may include strong authentication by an embedded credential, regular and reliable software updates, a system of watchdog messages that detects tampering, location tracking and geo-fenced operation, monitoring of telemetry data that may include antivirus scan reporting, audit log reporting, network attack detection reporting, intrusion attack detection reporting etc. However, if the central trust authority 125 is compromised, the centralized trust topology could be compromised by substituting an attack whitelist and distributing it to the processing nodes 105A-D. Additionally or alternatively, the processing nodes 105A-D could be attacked directly as only a relatively few processing nodes 105A-D need to be corrupted to compromise the centralized trust topology.

Figure 3:
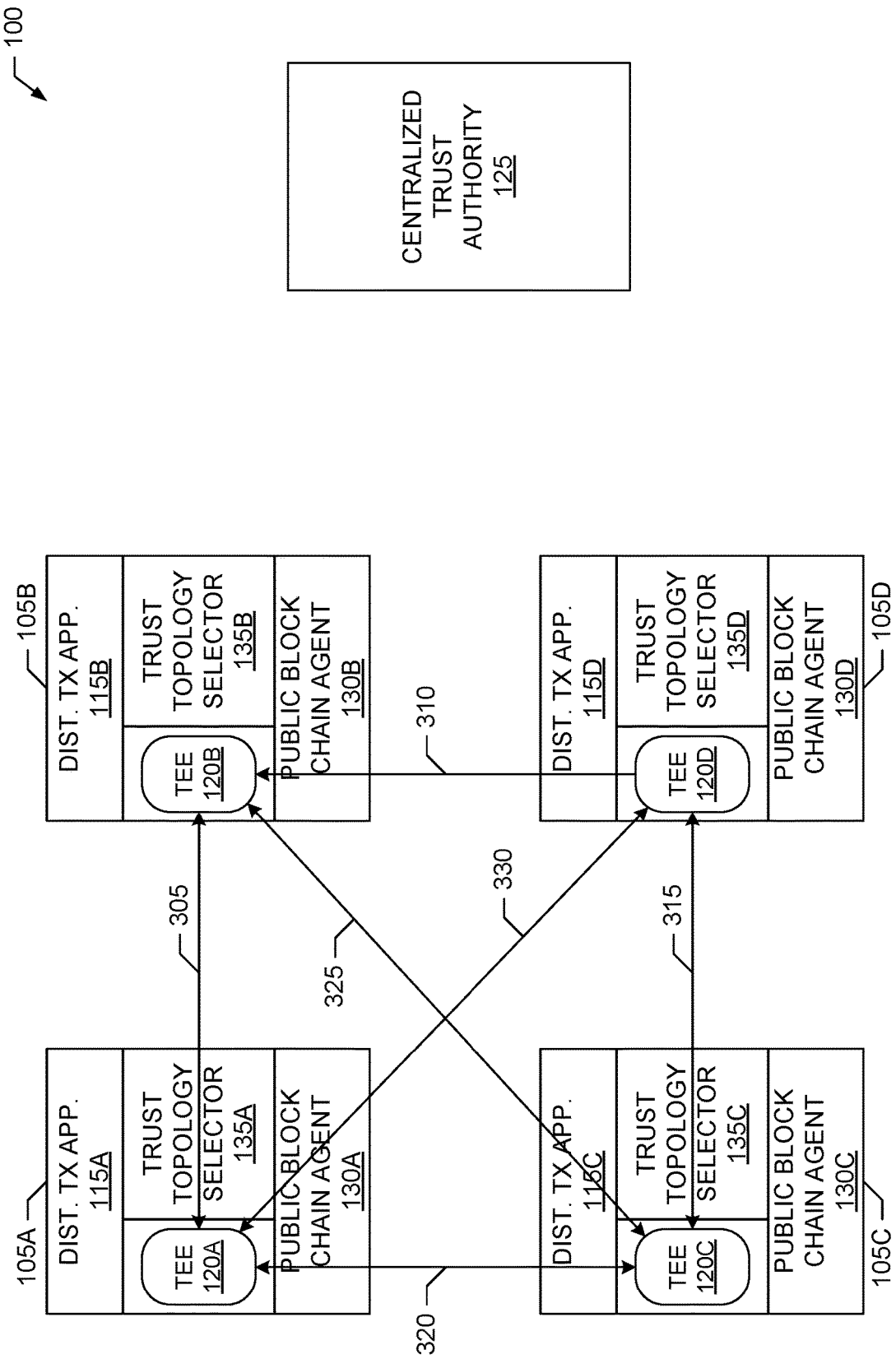
Figure 4:
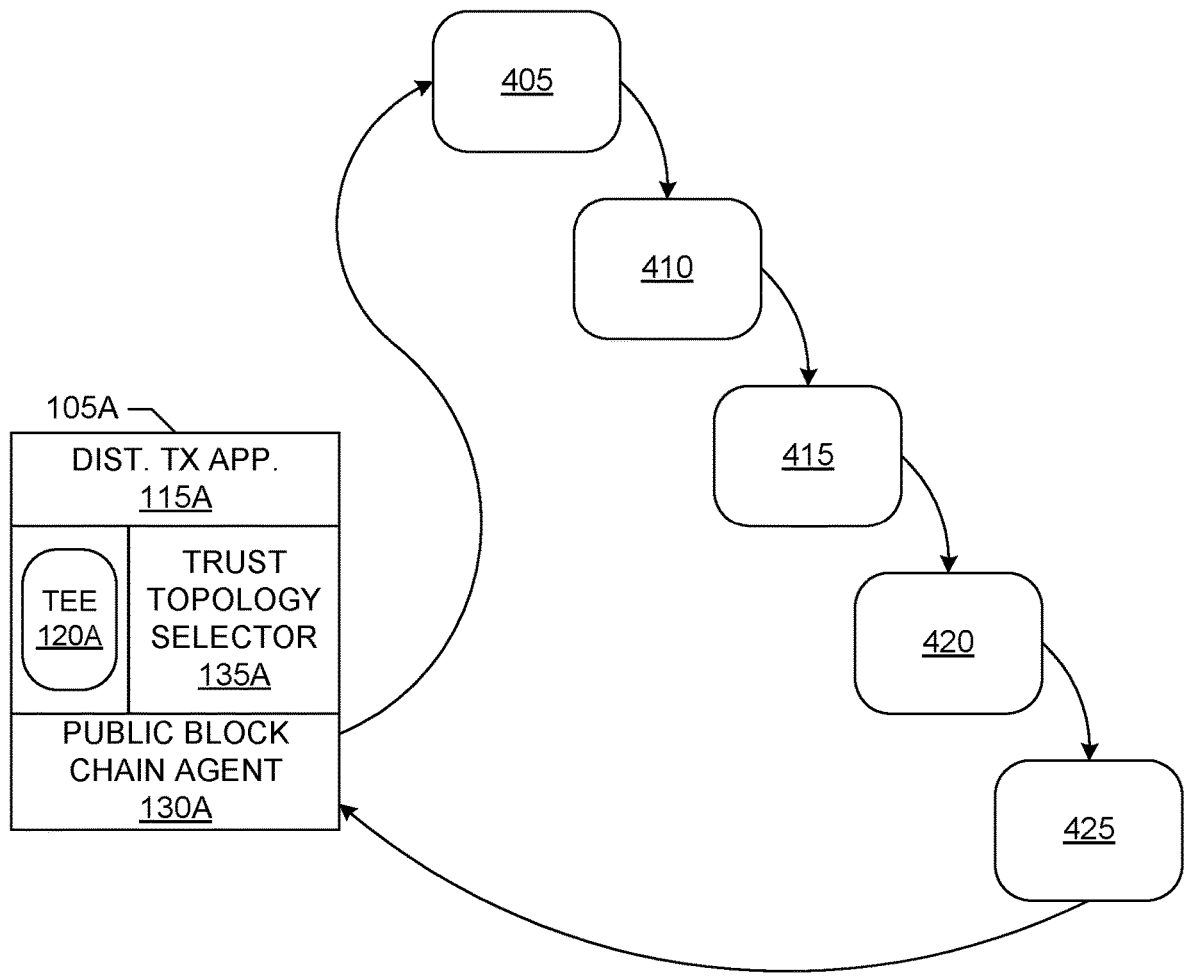
FIG. 4 illustrates an example public blockchain used to support distributed transaction processing in the example computing environment of FIG. 1 when a diffuse trust topology is selected in accordance with the teachings of this disclosure.

Thus, with reference to FIG. 3, in the illustrated example, the processing nodes 105A-D rely on their peers to perform attestations (represented by the directed lines 305-330) and to report the attestation results to a public blockchain, which is illustrated in FIG. 4. Such attestations 305-330 can be periodic, event driven, based on configured times, etc. In some examples, the attestations 305-330 are unidirectional such that a given processing node, such as the node 105A, performs attestation checks on the other processing node, such as the nodes 105B-D, and reports the attestation results to the public blockchain. In some examples, the attestations 305-330 are bidirectional such that pairs of the processing nodes 105A-D perform attestation checks on each other contemporaneously, and each of the pair of processing nodes reports their respective attestation results to the public blockchain. In the illustrated example, the processing nodes 105A-D periodically verify the whitelist provisioned by the centralized trust authority 125, and confirm that attestation verifications are consistent (e.g. not-compromised). Such attestation has little performance impact to transaction clearing over the private blockchain except for the attestation posts to the public blockchain.

In the illustrated example, a processing node 105A-D that is found to fail an attestation check is reported to the centralized trust authority 125, which removes the failed processing node 105A-D from the centralized trust topology (e.g., by provisioning an updated whitelist). However, the respective trust topology selector 135A-D of the failed processing node 105A-D can configure the node's distributed transaction application 115A-D to fail-over to the diffuse trust topology (e.g., implemented with a public blockchain) to allow the failed processing node 105A-D to continue clearing transactions, albeit at a lower throughput. This can be especially beneficial because attestation verification failures may not be due to malicious attacks, but merely due to benign changes that have not yet been identified as benign. Hence, the failed processing node 105A-D may still be able to produce valid transactions using the diffuse trust topology. Thus, a given processing node 105A-D found to be out of compliance with the whitelist may be excluded from future exchange in the centralized trust topology, and reverts to an untrusted state. Nevertheless, the affected processing node 105A-D can still be used to clear transactions via the public blockchain of the diffuse trust topology.

FIG. 4 illustrates an example public blockchain implementing a diffuse trust topology that may be used by one or more of the processing nodes 105A-D of the computing environment 100 to process transactions. In the illustrated example of FIG. 4, the trust topology selector 135A of the processing node 105A has configured the node's distributed transaction application 105A to process transactions using a public blockchain implemented by the processing node 105A in combination with a group of example processing nodes 405-425 (which may or may not include one or more of the example processing nodes 105B-D). In the illustrated example of FIG. 4, the public blockchain is implemented using any appropriate distributed consensus algorithm (DCA), such as DCAs implemented by Bitcoin or Ethereum, etc., that utilize distributed consensus to approve transaction logs. Such a diffuse trust topology relies on a large number of nodes 405-425 that agree when a transaction clears. Furthermore, a majority of the nodes 105A, 405-425 must collude to disrupt integral operation. The processing nodes 105A, 405-425 of the diffuse trust topology include public blockchain agents (e.g. miners), such as the example public blockchain agent 130A of the processing node 105A, to synchronize the transaction log to protect against insider malfeasance.

To supporting switching between the centralized and diffuse trust topologies, the trust topology selectors 135A-D of the processing nodes 105A-D of the illustrated example backup transaction records from the centralized, or private, blockchain of the centralized trust topology implemented by the nodes 105A-D to the decentralized, or public, blockchain of the diffuse trust topology implemented by the nodes 405-425. For example, the trust topology selector 135A of the processing node 105A takes snapshots of transactions records/blocks stored in the private blockchain of the centralized trust topology and writes the snapshot data to the public blockchain of the diffuse trust topology at periodic and/or aperiodic intervals, based on one or more backup events, etc. Such backups ensure the needed transaction history is available in the public blockchain of the diffuse trust topology should the trust topology selector 135A determine that the distributed transaction application 115A should be configured from using the centralized trust topology to the diffuse trust topology to process transactions. Also, such backups facilitate data recovery if, for example, the processing node 105A is removed from the centralized trust topology and is to rely on the diffuse trust topology for processing further transactions.

As disclosed above and in further detail below, the trust topology selectors 135A-D of the respective processing nodes 105A-D implement trust topology selection to integrate centralized trust (e.g., based on a private blockchain) with diffuse trust (e.g., based on a public blockchain) to improve availability of transaction processing. Such integration of centralized and diffuse trust can provide many advantages over prior distributed transaction processing techniques. For example, using selectable central and diffuse trust topologies in accordance with the teachings of this disclosure, processing nodes failing to satisfy a trust threshold rating in a centralized trust topology can continue to clear transactions, albeit at a slower transaction processing rate than is achievable when using the centralized trust topology to clear transactions, by switching to a diffuse trust topology. As another example, compromised nodes failing an attestation check can also be observed by a public blockchain to determine if there is a correlation between attestation check failures and failures to clear transactions properly (e.g., which can provide insight into the effectiveness of various attestation collection techniques). As yet a further example, whitelist measurements contributed to the public blockchain can be used to re-validate and resume operation of nodes in the private blockchain by provisioning an updated whitelist among peers.

Although the computing environment 100 of the illustrated example includes four processing nodes 105A-D and one centralized trust authority 125, trust topology selection for distributed transaction processing as disclosed herein is not limited thereto. For example, a computing environment implementing trust topology selection for distributed transaction processing as disclosed herein, such as the example computing environment 100, can include any number of processing nodes 105A-D, any number of centralized trust authorities 125, etc. Also, although each processing node 105A-D is depicted as including one respective distributed transaction application 115A-D in the illustrated example, trust topology selection for distributed transaction processing as disclosed herein is not limited thereto. For example, respective ones of the processing nodes 105A-D can include any number of distributed transaction application 115A-D to process the same type or different types of transactions in a computing environment, such as the computing environment 100. Furthermore, although the example computing environment 100 is described as supporting switching between two trust topologies, trust topology selection for distributed transaction processing as disclosed herein is not limited thereto. For example, trust topology selection, as disclosed herein, can be used to switch between any number of available trust topologies for processing transactions in a computing environment, such as the computing environment 100.

Figure 5A:
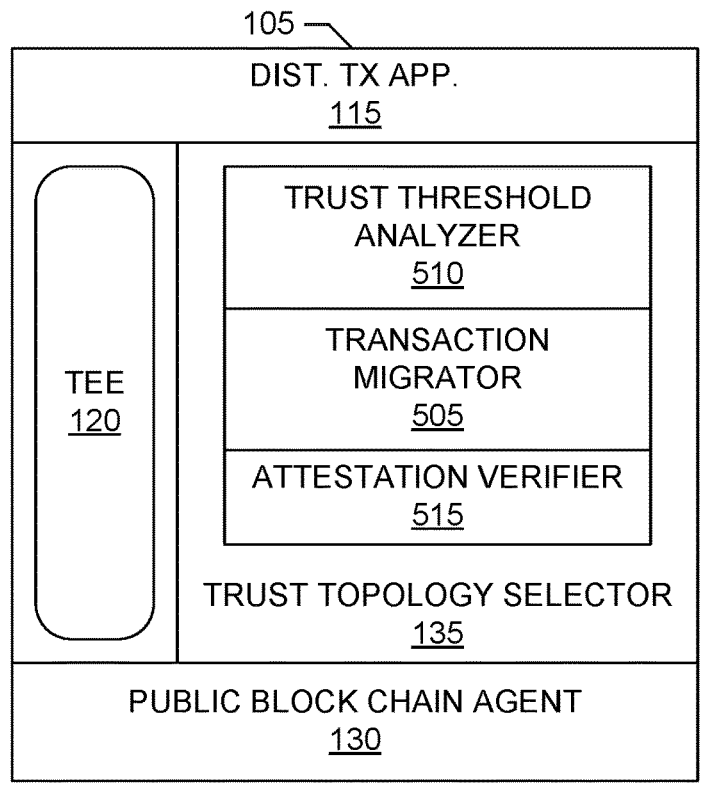
FIG. 5A illustrates an example implementation of a processing node that may be used to implement one or more of the processing nodes in the example computing environment of FIG. 1.

A block diagram illustrating an example processing node 105 that may be used to implement one or more of the example processing nodes 105A-D of FIGS. 1-4 is illustrated in FIG. 5A. The example processing node 105 can be implemented by any computing device, such as, but not limited to, a computer, a server, a virtual machine, a cloud service, a routing device (e.g., such as a sensor network gateway, a network access point, a network router, etc.), etc., or any combination thereof. In some examples, the computing device implementing the processing node 105 can be a mobile computing platform, such as, but not limited to, a mobile phone, a tablet device, a drone, an autonomous vehicle, etc. In some examples, the computing device implementing the processing node 105 can be a device in an IoT networking arrangement, which may include, but is not limited to, a mobile computing platform (such as those described above), an electronic appliance, an embedded electronic device, a sensor, a card/chip reader, etc. In some examples, the processing node 105 can be implemented by the example processing processor platform 900 of FIG. 9, which is described in further detail below.

The example processing node 105 of FIG. 5A includes an example distributed transaction application 115, such as the example distributed transaction application 115A-D, to process a transaction in the computing environment 100 based on at least one of a centralized trust topology or a diffuse trust topology. The example processing node 105 also includes an example trusted execution environment 120, such as the example trusted execution environment 120A-D, to protect first data associated with a centralized trust topology and to protect second data associated with a diffuse trust topology. For example, the first data can include first cryptographic key data and private blockchain data associated with the centralized trust topology, and the second data includes second cryptographic key data and public blockchain data associated with the diffuse trust topology. In the illustrated example of FIG. 5A, the distributed transaction application 115 implements the centralized trust topology based on the associated private blockchain cryptographic keys and data protected in the trusted execution environment 120, as described above. The example processing node 105 also includes an example public blockchain agent 130, such as the example public blockchain agents 130A-D, to implement the diffuse trust topology based on the associated public blockchain cryptographic keys and data protected in the trusted execution environment 120, as described above.

The example processing node 105 also includes an example trust topology selector 135, such as the example trust topology selector 135A-D, to selectively configure the distributed transaction application 115 to use the at least one of the centralized trust topology or the diffuse trust topology to process a transaction. The trust topology selector 135 enables the processing node 105 to participate in both the centralized and diffuse trust topologies simultaneously. For example, the trust topology selector 135 can selectively configure the distributed transaction application 115 to process transactions, under normal operating conditions, quickly using the centralized trust topology. However, if the processing node 105 falls out of whitelist compliance and is isolated from the relatively small cluster of nodes implementing the centralized trust topology, the trust topology selector 135 can selectively configure the distributed transaction application 115 to continue processing transactions using the diffuse trust topology (e.g., on the public blockchain). The trusted execution environment 120 is presumed to be hardened against malware attacks. Nevertheless, an insider attack compromising the centralized trust authority 125 could result in distributed transaction applications failing to trust each other.

The example trust topology selector 135 of FIG. 5A includes an example transaction migrator 505, an example trust threshold analyzer 510 and an example attestation verifier 515. The trust topology selector includes the transaction migrator 505 to determine a first trust value associated with the centralized trust topology, to determine a second trust value associated with the diffuse trust topology, and to determine whether the distributed transaction application 115 is to use the centralized trust topology or the diffuse trust topology based on the first trust value and the second trust value. In some examples, the transaction migrator 505 configures the distributed transaction application 115 to use the centralized trust topology when the first trust value (for the centralized trust topology) exceeds the second trust value (for the diffuse trust topology), but configures the distributed transaction application 115 to use the diffuse trust topology when the second trust value (for the diffuse trust topology) exceeds the first trust value (for the centralized trust topology). In some examples, when the first trust value matches the second trust value, the transaction migrator 505 further uses quality of service values to determine whether the distributed transaction application 115 is to use the centralized trust topology or the diffuse trust topology. For example, the transaction migrator 505 can configure the distributed transaction application 115 to use the centralized trust topology when a first quality of service value associated with the centralized trust topology exceeds a second quality of service value associated with the diffuse trust topology, but can configure the distributed transaction application 115 to use the diffuse trust topology when the second quality of service value associated with the diffuse trust topology exceeds the first quality of service value associated with the centralized trust topology.

For example, consider a distributed transaction (referred to as "Tx" below) that involves data (d1, dn), such that the distributed transaction application 115 (referred to as "A" below) of the processing node 105 operates on the data elements (d1 . . . dn). Also assume the distributed transaction application A classifies data (d1, . . . , dn) with sensitivity levels L=(l1, . . . , ln). For example, increasing values may correspond to increasing sensitivity levels, with lower levels (e.g., l1 and l2) associated with unclassified data, and higher levels (e.g., l3 and l4) associated with sensitive data. Furthermore, assume A is a distributed transaction application in a distribution of applications a={a1, a2, . . . an} that classify data (d1, . . . , dn) with sensitivity levels L=(l1, . . . , ln) such that a(DL)={(d1,l1), (d2,l2), . . . , (dn,ln)} and where a1→(d1, l1) is a first datum having a first sensitivity level and a second sensitivity level exists for a second datum at application a2 such that a2→(d2, l2). Also, let QoS represents an expected Quality-of-Service for a given trust topology, where QoS has parametrized cost based on attributes, such as, but not limited to, transaction throughput performance, transaction clearing cost, etc. Let M represents the machine learning feedback to be incorporated for a next iteration of scheduling calculations.

Based on these preliminaries, in some examples, the transaction migrator 505 of the trust topology selectors 135 defines an example transaction schedule S based on an example scheduling function F such that:

$$S(Tx)=F(\text{TRUST}(C,D,R,W),Tx,A,QoS,M) \qquad \text{Equation 1}$$

In Equation 1, TRUST( ) is a function that computes a trust value, such as a trust score or probability. In Equation 1, C represents the centralized trust topology used among a network of nodes (e.g., the nodes 105A-D) implementing the distributed application A. In some examples, C represents a probability that the centralized trust topology will preserve value at a given risk. In Equation 1, D represents the diffuse trust topology used among the network of nodes (e.g., the nodes 105A-D) implementing the distributed application A. In some examples, D represents a probability that the diffuse trust topology will preserve value at a given risk. In Equation 1, W represents the set of applications in A that comply with a whitelist configuration known to be trustworthy. For example, the whitelist may be provisioned by the centralized trust authority 125 and support security operations, such as, but not limited to, peer attestations, whitelist checks, antivirus scanning, firewall scans, etc. In Equation 1, R represents the risk that is at stake; such as the value or opportunity cost resulting from performing the transaction Tx.

In some examples, trust is characterized with a function TRUST(R, O, X) where R represents the potential benefit from performing the transaction, O represents the security operational cost, which can be expressed as probability that security operations will preserve value at risk, that is, O=p(W), and X is either C for the centralized trust topology, or D for the centralized trust topology. In such examples, a trust value for the centralized trust topology can be determined as:

$$\text{TRUST}(C)=(R*O*C) \qquad \text{Equation 2}$$

In such examples, a trust value for the diffuse trust topology can be determined as:

$$\text{TRUST}(D)=(R*O*D) \qquad \text{Equation 3}$$

In some such examples, the transaction migrator 505 of the trust topology selectors 135 determines whether to schedule or otherwise configure the distributed transaction application 115 to process a transaction using the centralized trust topology by evaluating the following equation:

$$S(Tx,C)=F(\text{TRUST}(C),Tx,A,\text{QoS},M) \quad \text{Equation 4}$$

For example, the transaction migrator 505 can configure the distributed transaction application 115 to process a transaction using the centralized trust topology if the value of Equation 4 satisfies a threshold. Similarly, in some such examples, the transaction migrator 505 of the trust topology selectors 135 determines whether to schedule or otherwise configure the distributed transaction application 115 to process a transaction using the diffuse trust topology by evaluating the following equation:

$$S(Tx,D)=F(\text{TRUST}(T),Tx,A,\text{QoS},M) \quad \text{Equation 5}$$

For example, the transaction migrator 505 can configure the distributed transaction application 115 to process a transaction using the diffuse trust topology if the value of Equation 5 satisfies a threshold.

In some such examples, the transaction migrator 505 of the trust topology selectors 135 selects whether to schedule or otherwise configure the distributed transaction application 115 to process a transaction using the centralized trust topology or the diffuse trust topology by evaluating the following equation:

$$S(Tx,C,D)=F(\text{Choice}(\text{TRUST}(C),\text{TRUST}(D)),Tx,A,\text{QoS},M) \quad \text{Equation 6}$$

For example, the transaction migrator 505 may generate a transaction schedule that takes into consideration the risks associated with centralized trust topology vs. the diffuse trust topology. Example choices for determining which topology to use to process a distributed transaction Tx include:

$S(Tx,C)$: if $\text{TRUST}(C) > \text{TRUST}(D)$ $S(Tx,D)$: if $\text{TRUST}(D) >= \text{TRUST}(C)$ Accordingly, the transaction migrator 505 can configure the distributed transaction application 115 to process the distributed transaction on the trust topology (e.g., centralized or diffuse) that is most likely to perform the transaction at a desired (e.g., optimal) risk.

By way of example, consider a scenario in the distributed transaction application 115 executed by the processing node 105 is a remittance transaction application (A) to process payments from an originating country to a destination country. For example, the processing node 105 could be implemented by a mobile computing platform, such as, but not limited to, a mobile phone, a tablet device, a drone, an autonomous vehicle, etc., capable of moving among the different countries. The application A may classify user credentials, bank account details, etc., as sensitive data (e.g. level 12) and other information such as transfer time, exchange commission, etc., as non-sensitive data (e.g., level 11). In this example, the transaction migrator 505 of the trust topology selector 135 has two options for configuring the trust topology used by the application A, namely, a centralized trust topology federated by a broker, such as the example centralized trust authority 125, or a diffuse trust topology implemented among a group of peer nodes. Also, QoS can be transfer time, transfer cost, guarantee of the transfer, etc. For example, assume QoS is based on cost, and the centralized trust topology C is associated with high cost, whereas the diffuse trust topology D is associated with low cost. Furthermore, assume the transaction migrator 505 has been configured to select the topology having the lowest cost and, thus, QoS is inversely proportional to cost. In such an example, the equations illustrated the possible scheduling options that may be selected by the transaction migrator 505 of the trust topology selector 135:

$S(Tx,C,D)=F(\text{TRUST}(C))$ or $F(\text{TRUST}(D))$, if TRUST and QoS are same in $C$ and $D$, $S(Tx,C,D)=F(\text{TRUST}(C))$, if $\text{TRUST}(C) > \text{TRUST}(D)$ and QoS are same in $C$ and $D$, $S(Tx,C,D)=F(\text{TRUST}(D))$, if $\text{TRUST}(D) > \text{TRUST}(C)$ and QoS are same in $C$ and $D$, $S(Tx,C,D)=F(\text{TRUST}(C))$, if $\text{TRUST}(C) = \text{TRUST}(D)$ and $\text{QoS}(C) > \text{QoS}(D)$, $S(Tx,C,D)=F(\text{TRUST}(D))$, if $\text{TRUST}(D) = \text{TRUST}(C)$ and $\text{QoS}(D) > \text{QoS}(C)$, In the above example, with QoS inversely proportional to cost, QoS(D) is greater than QoS(C) and, thus, the distributed transaction Tx may be scheduled in the diffuse trust topology D if the trust scores between the centralized trust topology C and the diffuse trust topology D match (e.g., are the same, possibly within a tolerance). However, if there was some hidden cost in the diffuse trust topology D realized post transaction processing, transaction migrator 505 can use the factor M to adjust the near future transaction scheduling decision.

The example trust topology selector 135 of FIG. 5A also includes the example trust threshold analyzer 510 to monitor telemetry data associated with operation of the example processing node 105 to determine whether to isolate the processing node 105 from the centralized trust topology. The trust threshold analyzer 510 of the illustrated example is also to configure the distributed transaction application 115 to use the diffuse trust topology in response to determining that the processing node 105 is to be isolated from the centralized trust topology. For example, trust threshold analyzer 510 monitors telemetry data locally to detect possible attacks, irregular patterns associated with interactions with the centralized trust authority 125, errors associated with peer attestations and/or other actions taken to further isolate the node 105 from its peers in the cluster of nodes implementing the centralized trust topology. If any such attack signatures are satisfied, the trust threshold analyzer 510 may transition transaction processing from the centralized trust topology to the diffuse trust topology. This enables the processing node 105 to continue processing transactions by relying upon the alternative diffuse trust topology associated with the public blockchain.

The example trust topology selector 135 of FIG. 5A further includes the example attestation verifier 515 to perform peer attestations with other processing nodes based on a whitelist provided by a centralized trust authority, such as the centralized trust authority 125, as described above. The attestation verifier 515 of the illustrated example is also to report results of the peer attestations to a blockchain (e.g., a public blockchain) associated with the diffuse trust topology to determine whether the processing node 105 is to be isolated from the centralized trust topology, as described above. Furthermore, in some examples, the attestation verifier 515 performs backups of transaction records from the centralized, or private, blockchain of the centralized trust topology implemented in the computing environment 100 to the decentralized, or public, blockchain of the diffuse trust topology implemented in the computing environment 100, as described above.

Thus, the example trust topology selector 135 of FIG. 5A enables the distributed transaction application 115 of the processing node 105 to use either a centralized trust topology or a diffuse trust topology, as appropriate, to provide an improved overall trust solution for clearing transactions. During normal operation, transaction processing can occur using the centralized trust topology, which is optimized for high throughput. However, should failure or security isolation take place, transaction processing may continue using the diffuse trust topology, albeit at a slower transaction processing rate (e.g., until the processing node 105 or cluster of nodes can be rebuilt) than is achievable when using the centralized trust topology for transaction processing. Furthermore, trust in the overall operation of the processing node 105 is improved due to periodic backup check-pointing and integrity reporting to the public blockchain implementing the diffuse trust topology.

Figure 2:
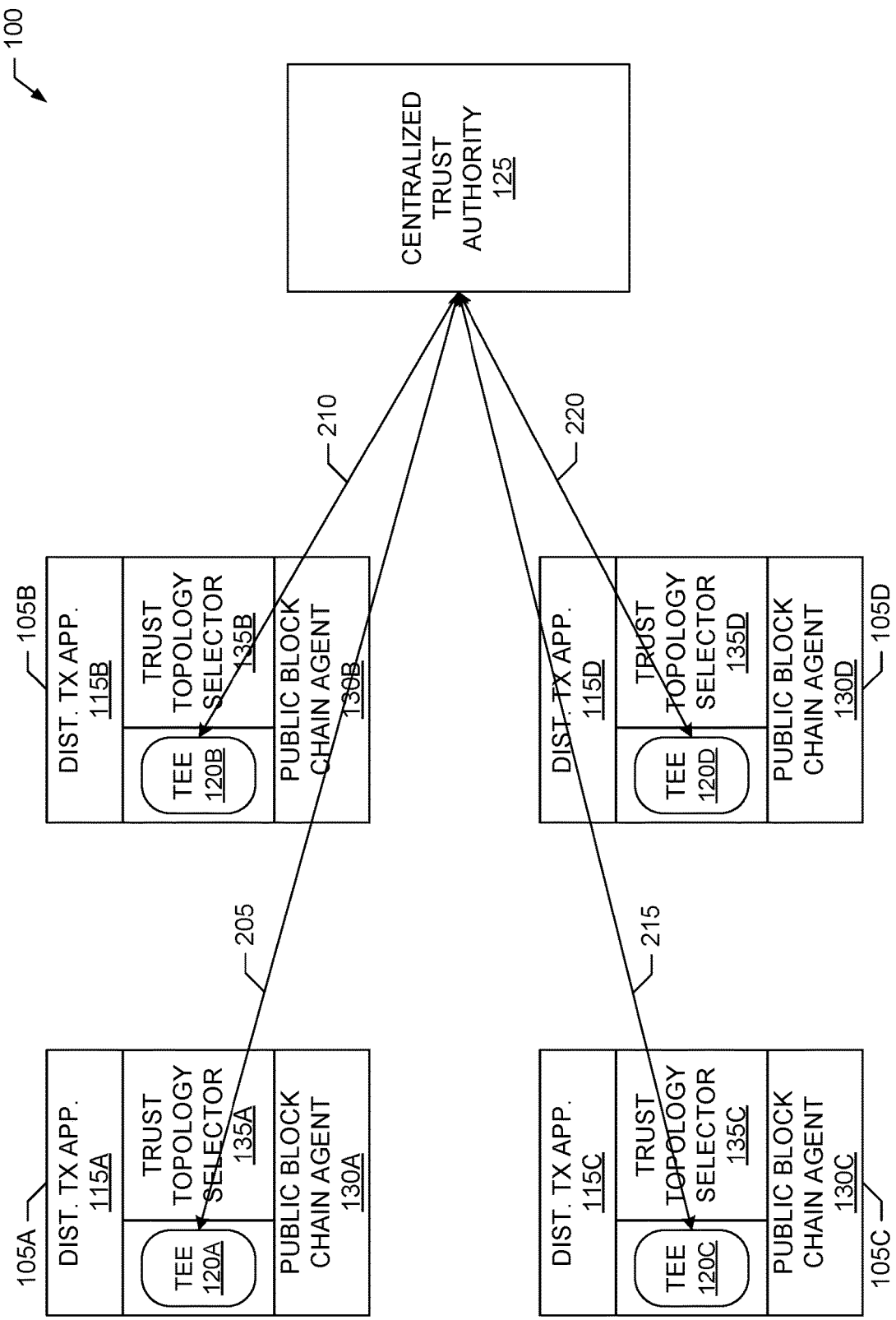
FIGS. 2-3 illustrate example operations performed by the processing nodes in the example computing environment of FIG. 1 to support distributed transaction processing when a centralized trust topology is selected in accordance with the teachings of this disclosure.
Figure 5B:
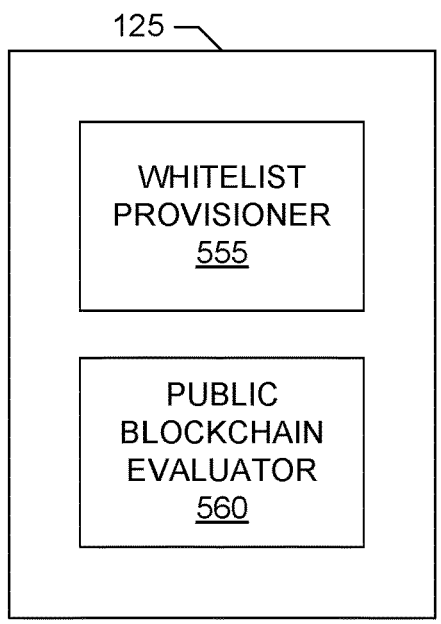
FIG. 5B illustrates an example implementation of an example centralized trust authority included in the example computing environment of FIG. 1.

A block diagram of an example implementation of the centralized trust authority 125 of FIGS. 1-3 is illustrated in FIG. 5B. The example centralized trust authority 125 of FIG. 5B includes an example whitelist provisioner 555 to provision a whitelist to processing nodes participating in a centralized trust topology. For example, the whitelist provisioner 555 can provision a whitelist to the processing nodes 105A-D participating in centralized trust topology implemented in the example computing environment 100, as described above in connection with FIG. 2. In some examples, the whitelist provisioned by the whitelist provisioner 555 identifies valid (and invalid) processing nodes that may be trusted (or not trusted) in the centralized trust topology, as well as whitelist measurements that processing nodes (e.g., peers) in the topology are to use to perform peer attestations/verifications.

The example centralized trust authority 125 of FIG. 5B also includes an example public blockchain evaluator 560 to evaluate the attestation results reported by the processing nodes (e.g., the nodes 105A-D) participating in the centralized trust topology to the public blockchain (e.g., associated with a diffuse trust topology), as described above. In some examples, the public blockchain evaluator 560 evaluates the attestation results reported to the public blockchain to revalidate a processing node included in the centralized trust topology. For example, after operation of a processing node in the centralized trust topology is halted (e.g., due to software or hardware update, or any other reason), the public blockchain evaluator 560 may evaluate prior attestation results represented in the public blockchain for this processing node to determine whether the processing node can resume participation in the centralized trust topology. In some examples, the public blockchain evaluator 560 may cause the whitelist provisioner 555 to provision an updated whitelist to allow the affected processing node to resume participation in the centralized trust topology.

The public blockchain evaluator 560 of the illustrated example can additionally or alternatively evaluate the public blockchain to determine the effectiveness of the attestation technique(s) being used to validate the processing nodes (e.g., the nodes 105A-D) participating in the centralized trust topology. For example, the public blockchain evaluator 560 may evaluate the public blockchain for transactions associated with node(s) that failed attestation checks in the centralized trust topology (and, thus, are now processing transactions using the diffuse trust topology) to determine if there is a correlation between attestation check failures and failures to clear transactions properly. In some examples, the public blockchain evaluator 560 determines there is a correlation between attestation check failures and failures to clear transactions properly if the public blockchain evaluator 560 observes that processing node(s) that failed attestation checks also fail to clear transactions on the public blockchain. However, the public blockchain evaluator 560 may find a lack of correlation if the processing node(s) that failed attestation checks are able to clear transactions on the public blockchain.

Figure 11:
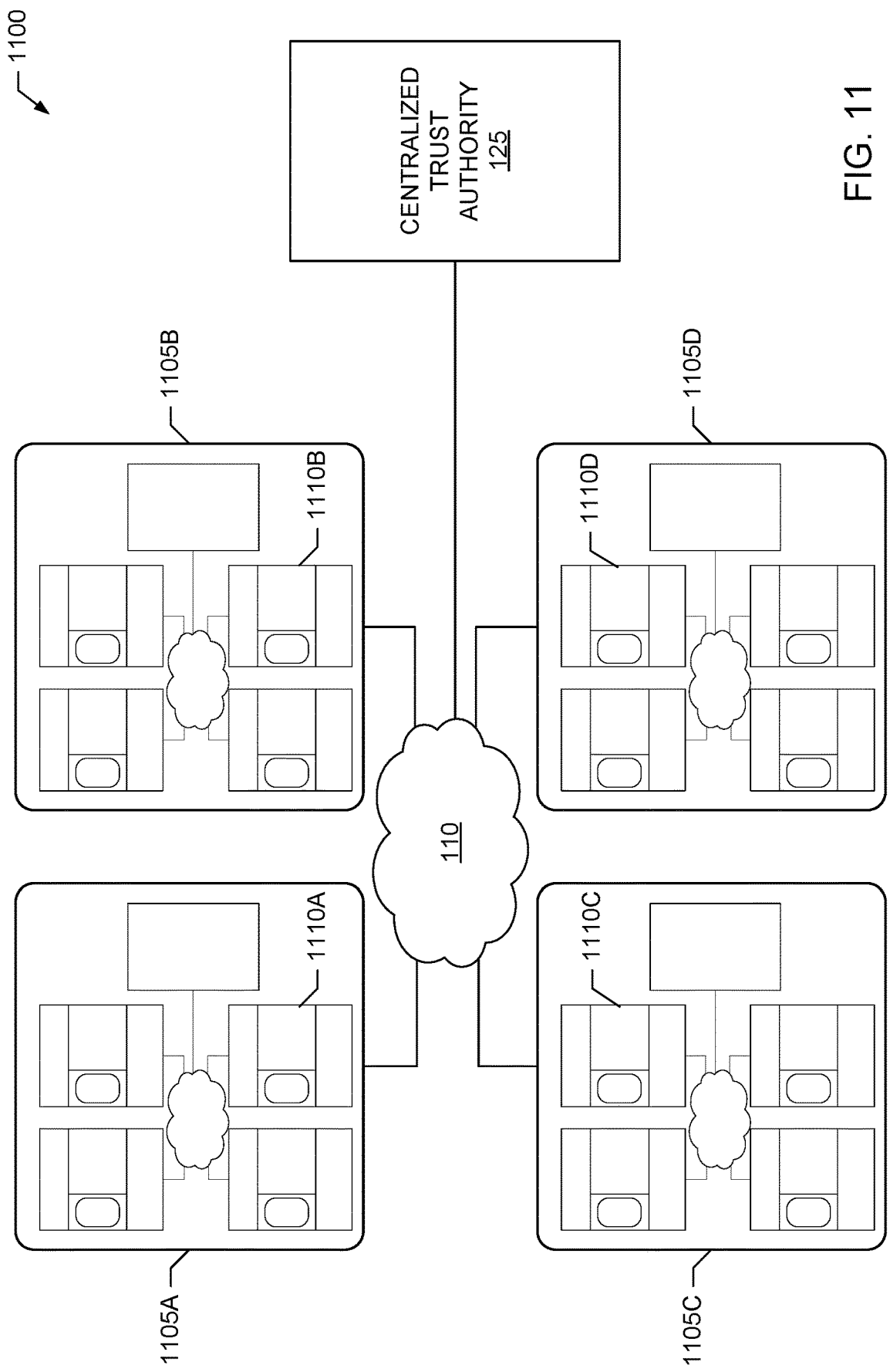
FIG. 11 is a block diagram of an example computing environment implementing trust topology selection for an example hierarchical trust arrangement in accordance with the teachings of this disclosure.

Trust topology selection as disclosed herein can also be used to select among different trust topologies in various hierarchical trust arrangements. An example computing environment 1100 implementing trust topology selection for an example hierarchical trust arrangement in accordance with the teachings of this disclosure is illustrated in FIG. 11. In the computing environment 1100 of the illustrated example, processing nodes are arranged into example node clusters 1105A-D. Each of the node clusters 1105A-D includes respective processing nodes, such as the example processing nodes 105A-D, which execute distributed transaction applications, such as the example distributed transaction applications 115A-D, to process (e.g., clear) transactions in the computing environment 1100. Additionally, each of the example node clusters 1105A-D implements a respective centralized trust topology and a respective diffuse trust topology local to that particular node cluster. As such, the processing nodes in the node clusters 1105A-D include trusted execution environments and public blockchain agents, such as the example trusted execution environments 120A-D and the example public blockchain agents 130A-D, to implement the centralized and diffuse trust topologies local to each of the node clusters 1105A-D. Furthermore, the processing nodes in the node clusters 1105A-D include trust topology selectors, such as the example trust topology selectors 135A-D, to selectively configure, as described above, the processing nodes within a given cluster to use that cluster's centralized trust topology or the diffuse trust topology to process transactions within the cluster.

In the example computing environment 1100 of FIG. 11, the node clusters 1105A-D are also in communication with each other via a network, such as the example network 110 described above. Each node cluster 1105A-D of the illustrated example also includes a respective, example master processing node 1110A-D in communication with the other master processing nodes of the other clusters via the network 110. The master processing nodes 1110A-D act as gateways between the node clusters 1105A-D to permit transactions to be processed across clusters. In the illustrated example, the master processing nodes 1110A-D implement a centralized trust topology and a diffuse trust topology at a macro level among the node clusters 1105A-D using the techniques described above. As such, the example computing environment 1100 of FIG. 11 includes a centralized trust authority, such as the example centralized trust authority 125, to enable the master processing nodes 1110A-D to implement the macro-level centralized trust topology. In the illustrated example, the master processing nodes 1110A-D are further configured with macro-level trust topology selectors, similar to the example trust topology selectors 135A-D, to implement trust topology selection as disclosed herein to select whether the macro-level centralized trust topology or the macro-level diffuse trust topology implemented among the node clusters 1105A-D is used to process (e.g., clear) a given transaction.

In some examples, the node clusters 1105A-D are associated with respective communication coverage areas, and one or more of the processing nodes included in the clusters 1105A-D are implemented by mobile computing platforms, such as, but not limited to, mobile phones, tablet devices, drones, autonomous vehicles, etc. In such examples, the node clusters 1105A-D implement trust topology selection as disclosed herein to enable the mobile computing platforms within the node clusters 1105A-D to process transactions locally among other nodes within the same coverage area. Moreover, in some such examples, the master processing nodes 1110A-D of the respective node clusters 1105A-D are implemented by routing devices, such as, but not limited to, network access points, network routers, etc., configured to perform trust topology selection as disclosed herein to allow the mobile computing platforms within the node clusters 1105A-D to process transactions on a macro-level across coverage areas.

While example manners of implementing the example computing environment 100 are illustrated in FIGS. 1-4 and 5A-B, one or more of the elements, processes and/or devices illustrated in FIGS. 1-4 and 5A-B may be combined, divided, re-arranged, omitted, eliminated and/or implemented in any other way. Further, the example processing nodes 105, 105A-D, the example network 110, the example distributed transaction applications 115, 115A-D, the example trusted execution environments 120, 120A-D, the example centralized trust authority 125, the example public blockchain agents 130, 130A-D, the example trust topology selectors 135, 135A-D, the example transaction migrator 505, the example trust threshold analyzer 510, the example attestation verifier 515, the example whitelist provisioner 555, the example public blockchain evaluator 560 and/or, more generally, the example computing environment 100 of FIGS. 1-4 and 5A-B may be implemented by hardware, software, firmware and/or any combination of hardware, software and/or firmware. Thus, for example, any of the example processing nodes 105, 105A-D, the example network 110, the example distributed transaction applications 115, 115A-D, the example trusted execution environments 120, 120A-D, the example centralized trust authority 125, the example public blockchain agents 130, 130A-D, the example trust topology selectors 135, 135A-D, the example transaction migrator 505, the example trust threshold analyzer 510, the example attestation verifier 515, the example whitelist provisioner 555, the example public blockchain evaluator 560 and/or, more generally, the example computing environment 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processing nodes 105, 105A-D, the example network 110, the example distributed transaction applications 115, 115A-D, the example trusted execution environments 120, 120A-D, the example centralized trust authority 125, the example public blockchain agents 130, 130A-D, the example trust topology selectors 135, 135A-D, the example transaction migrator 505, the example trust threshold analyzer 510, the example attestation verifier 515, the example whitelist provisioner 555 and/or the example public blockchain evaluator 560 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing environment 100 may include one or more elements, processes and/or devices in addition to, or instead of, those illustrated in FIGS. 1-4 and 5A-B, and/or may include more than one of any or all of the illustrated elements, processes and devices.

Figure 6:
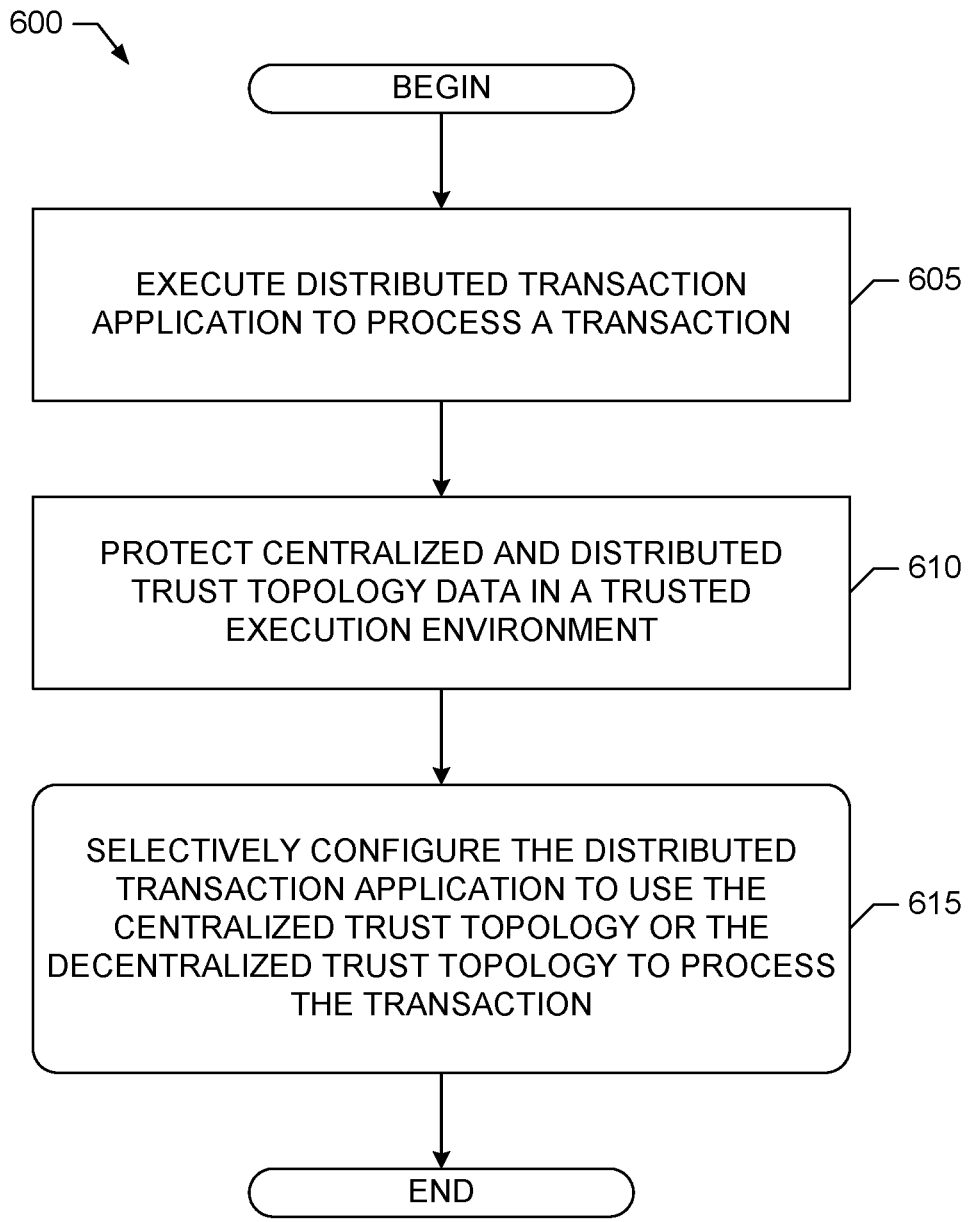
FIGS. 6-7 are flowcharts representative of example computer readable instructions that may be executed to implement the example processing node(s) of FIGS. 1-4 and/or 5A.
Figure 7:
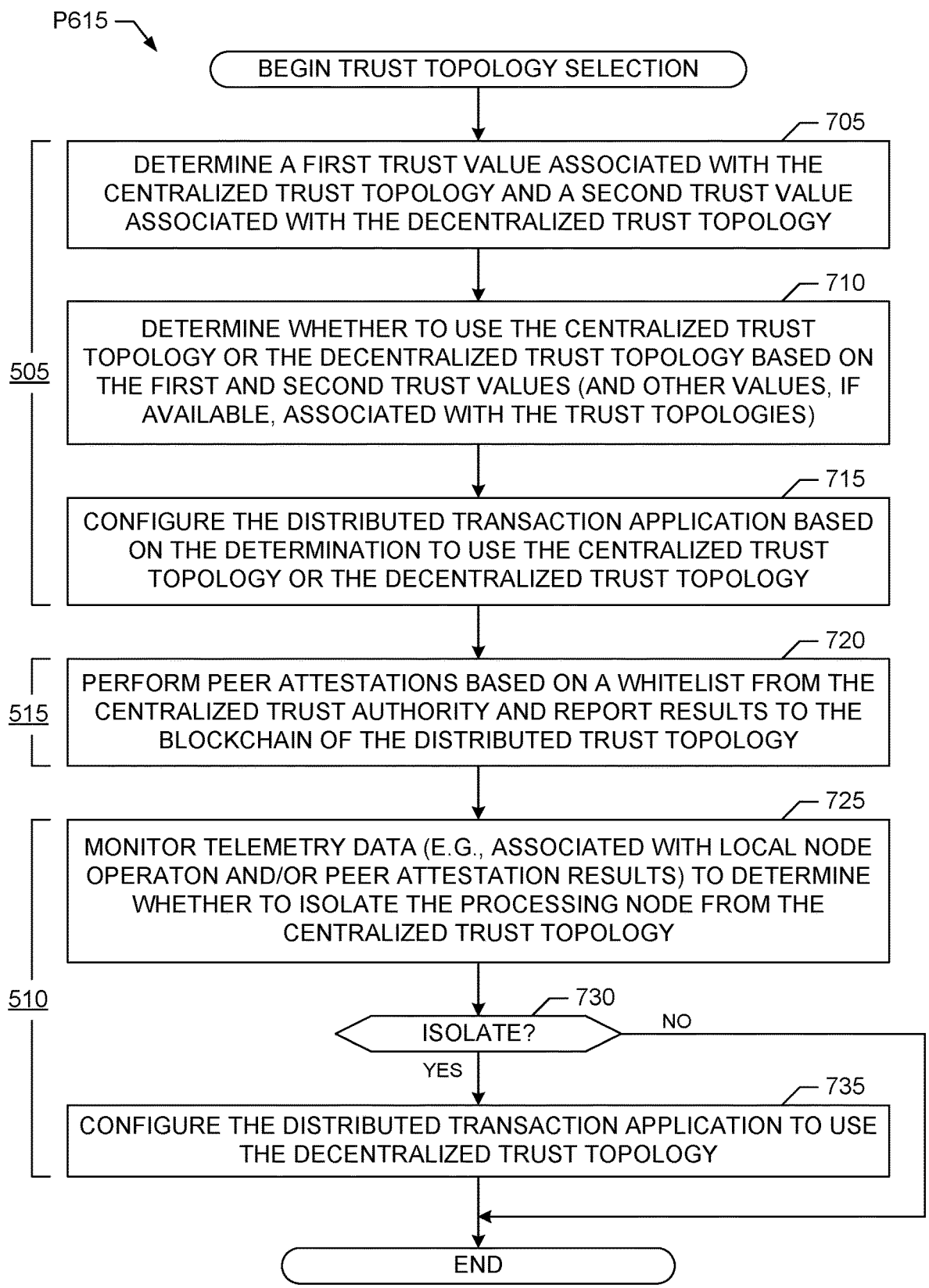
Figure 8:
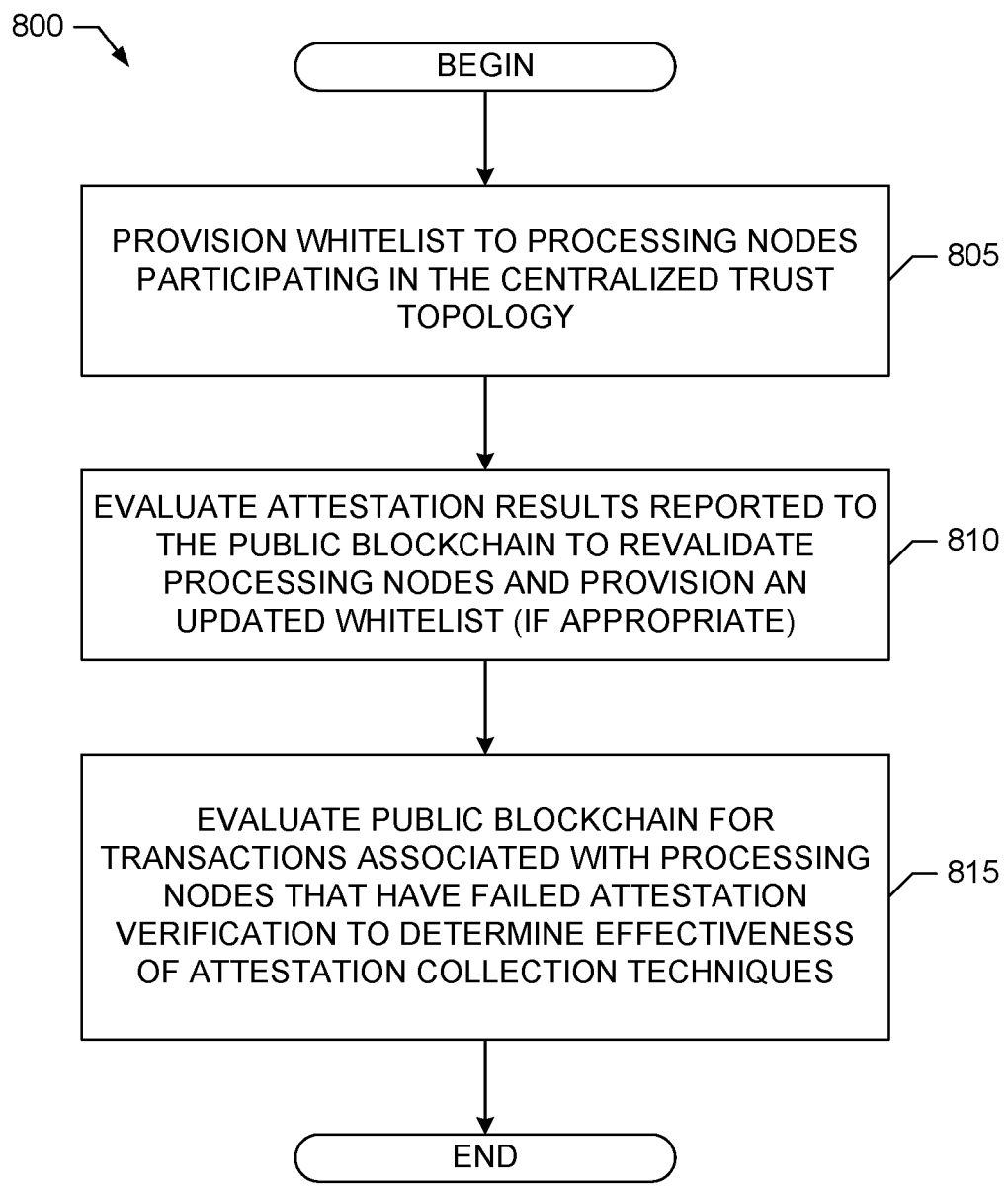
FIG. 8 is a flowchart representative of example computer readable instructions that may be executed to implement the example centralized trust authority of FIGS. 1-3 and/or 5B.

Flowcharts representative of example machine readable instructions for implementing one or more of the example processing nodes 105, 105A-D are shown in FIGS. 6 and 7. A flowcharts representative of example machine readable instructions for implementing the example centralized trust authority 125 are shown in FIG. 8. In these examples, the machine readable instructions comprise one or more programs for execution by a processor, such as the processors 912 and/or 1012 shown in the example processor platforms 900 and/or 1000 discussed below in connection with FIGS. 9-10. The one or more programs, or portion(s) thereof, may be embodied in software stored on one or more non-transitory computer readable storage media such as a CD-ROM, a floppy disk, a hard drive, a digital versatile disk (DVD), a Blu-ray Disk™, or a memory associated with the processors 912 and/or 1012, but the entire program or programs and/or parts thereof could alternatively be executed by a device other than the processors 912 and/or 1012, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-8, many other methods of implementing the example processing nodes 105, 105A-D and/or the example centralized trust authority 125 may alternatively be used. For example, with reference to the flowcharts illustrated in FIGS. 6-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6-8 may be implemented using coded instructions (e.g., computer and/or machine readable instructions) stored on one or more non-transitory computer and/or machine readable media such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

An example program 600 that may be executed to implement one or more of the example processing nodes 105, 105A-D of FIGS. 1-5A is illustrated in FIG. 6. For convenience and without loss of generality, execution of the example program 600 is described from the perspective of the example processing node 105 of FIG. 5A implementing the example processing node 105A of FIGS. 1-4. With reference to the preceding figures and corresponding written descriptions, execution of the example program 600 of FIG. 6 begins at block 605 at which the processing node 105 executes the example distributed transaction application 115, as described above, to process transactions in the example computing environment 100. At block 610, the example trusted execution environment 120 of the processing node 105 protects, as described above, data associated with the centralized and diffuse trust topologies that can be used by the distributed transaction application 115 to process transactions in the computing environment 100. At block 615, the example trust topology selector 135 of the processing node 105 selectively configures, as described above, the distributed transaction application 115 to use the centralized trust topology or the diffuse trust topology to process a given transaction. An example program that may be executed to perform the processing at block 615 is illustrated in FIG. 7, which is described in further detail below.

An example program P615 that may be executed to perform the processing at block 615 of FIG. 6 is illustrated in FIG. 7. With reference to the preceding figures and corresponding written descriptions, execution of the example program P615 of FIG. 7 begins at block 705 at which the example transaction migrator 505 of the example trust topology selector 135 of the example processing node 105 determines, as described above, a first trust value associated with the centralized trust topology and a second trust value associated with the diffuse trust topology implemented in the computing environment 100. At block 710, the transaction migrator 505 determines, as described above, whether the distributed transaction application 115 of the processing node 105 is to use the centralized trust topology or the diffuse trust topology based on the first trust value and the second trust value determined at block 705. At block 715, the transaction migrator 505 configures, as described above, the distributed transaction application 115, based on the determination made at block 710, to process a transaction using either the centralized trust topology or the diffuse trust topology.

At block 720, the example attestation verifier 515 of the trust topology selector 135 performs peer attestations with other distributed transaction processing nodes (e.g., the example nodes 105B-D) based on a whitelist provided by the example centralized trust authority 125, as described above. At block 720, the attestation verifier 515 also reports results of the peer attestations to a blockchain associated with the diffuse trust topology, as described above. The reported results of peer attestations can be used to determine whether the processing node 105 is to be isolated from the centralized trust topology (e.g., when one or more attestations with the processing node 105 fail).

At block 725, the example trust threshold analyzer 510 of the trust topology selector 135 monitors telemetry data associated with operation of the processing node 105 to determine whether to isolate the processing node 105 from the centralized trust topology, as described above. If the processing node 105 is to be isolated from the centralized trust topology (block 730), then at block 735, the trust threshold analyzer 510 configures the distributed transaction application 115 to use the diffuse trust topology to process transaction.

An example program 800 that may be executed to implement the example centralized trust authority 125 of FIGS. 1-3 and 5B is illustrated in FIG. 8. With reference to the preceding figures and corresponding written descriptions, execution of the example program 800 of FIG. 8 begins at block 805 at which the example whitelist provisioner 555 of the centralized trust authority 125 provision a whitelist to processing nodes (e.g., the example processing nodes 105A-D) participating in a centralized trust topology, as described above. At block 810, the example public blockchain evaluator 560 of the centralized trust authority 125 evaluates, as described above, the attestation results previously reported to the public blockchain (e.g., associated with a diffuse trust topology) for the processing nodes participating in the centralized trust topology to revalidate, as needed, processing node(s) included in the centralized trust topology (and cause updated whitelist(s) to be provisioned, if appropriate). At block 815, the public blockchain evaluator 560 evaluates the public blockchain for transactions associated with processing nodes that failed prior attestation checks in the centralized trust topology to determine the effectiveness of the attestation technique(s) being used to validate the processing nodes (e.g., the nodes 105A-D) participating in the centralized trust topology, as described above.

Figure 9:
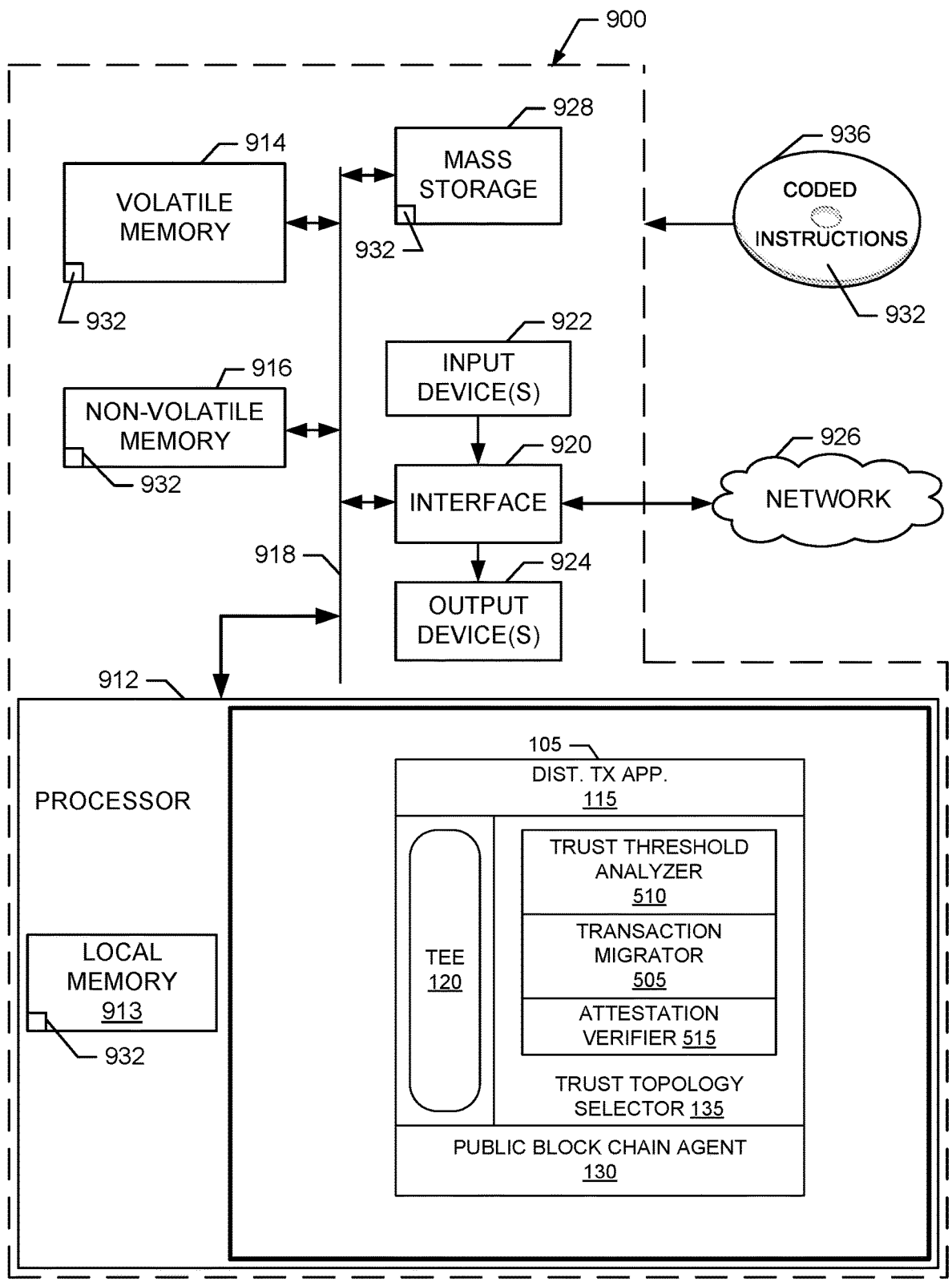
FIG. 9 is a block diagram of an example processor platform structured to execute the example computer readable instructions of FIGS. 6 and/or 7 to implement the example processing node(s) of FIGS. 1-4 and/or 5A.

FIG. 9 is a block diagram of an example processor platform 900 structured to execute the instructions of FIGS. 6-7 to implement the example processing node 105 of FIG. 5A. The processor platform 900 can be, for example, a computer, a server, a virtual machine, a cloud service, a routing device (e.g., such as a sensor network gateway, a network access point, a network router, etc.), a mobile computing platform (e.g., a mobile phone, a tablet device, such as an iPad™, a drone, an autonomous vehicle, etc.), an electronic appliance, an embedded electronic device, a sensor, a card/chip reader, etc., or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example distributed transaction application 115, the example trusted execution environment 120, the example public blockchain agent 130, the example trust topology selector 135, the example transaction migrator 505, the example trust threshold analyzer 510 and/or the example attestation verifier 515.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device or technology, such as Intel® 3D Xpoint™ memory technology, Intel® Optane™ memory technology, etc. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine user interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives.

Coded instructions 932 corresponding to the instructions of FIGS. 6-7 may be stored in the mass storage device 928, in the volatile memory 914, in the non-volatile memory 916, in the local memory 913 and/or on a removable tangible computer readable storage medium, such as a CD or DVD 936.

Figure 10:
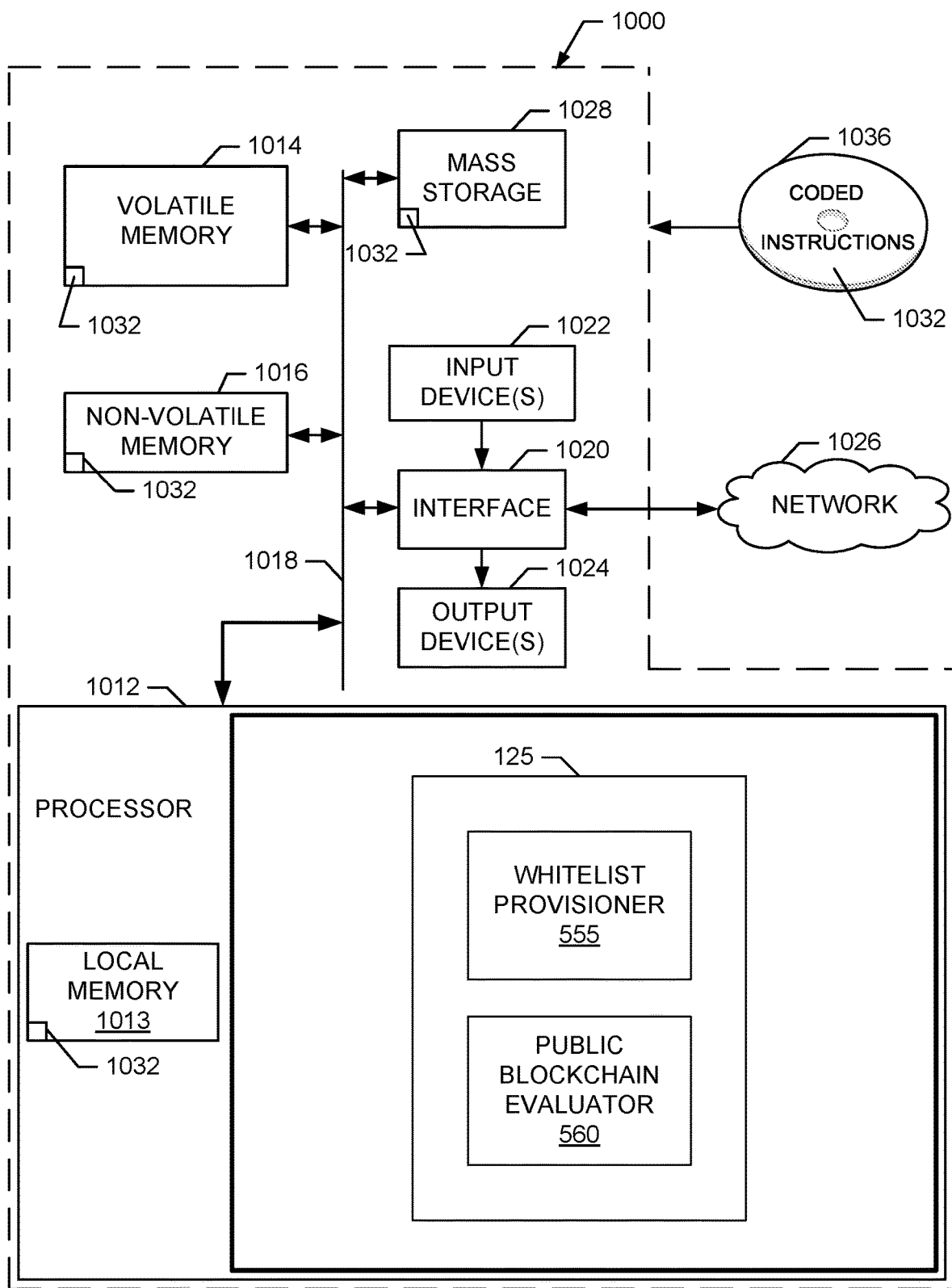
FIG. 10 is a block diagram of an example processor platform structured to execute the example computer readable instructions of FIG. 8 to implement the example centralized trust authority of FIGS. 1-3 and/or 5B.

FIG. 10 is a block diagram of an example processor platform 1000 structured to execute the instructions of FIG. 8 to implement the example centralized trust authority 125 of FIG. 5B. The processor platform 1000 can be, for example, a computer, a server, a virtual machine, a cloud service, a routing device (e.g., such as a sensor network gateway, a network access point, a network router, etc.), a mobile computing platform (e.g., a mobile phone, a tablet device, such as an iPad™, a drone, an autonomous vehicle, etc.), an electronic appliance, an embedded electronic device, a sensor, a card/chip reader, etc., or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device. In this example, the processor 1012 implements the example whitelist provisioner 555 and/or the example public blockchain evaluator 560.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device or technology, such as Intel® 3D Xpoint™ memory technology, Intel® Optane™ memory technology, etc. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine user interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., an LED, an OLED, a liquid crystal display, a CRT display, a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a DSL, a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives.

Coded instructions 1032 corresponding to the instructions of FIG. 8 may be stored in the mass storage device 1028, in the volatile memory 1014, in the non-volatile memory 1016, in the local memory 1013 and/or on a removable tangible computer readable storage medium, such as a CD or DVD 1036.

The foregoing disclosure provides examples of providing trust topology selection for distributed transaction processing in computing environments. The following further examples, which include subject matter such as an apparatus, such as a distributed transaction processing node, to perform trust topology selection for distributed transaction processing, at least one computer-readable storage medium including instructions that, when executed by at least one processor, cause the at least one processor to perform trust topology selection for distributed transaction processing, means for performing trust topology selection for distributed transaction processing, and a method to perform trust topology selection for distributed transaction processing, are disclosed herein. The disclosed examples can be implemented individually and/or in one or more combinations.

Example 1 is a distributed transaction processing node including a distributed transaction application to process a transaction in a computing environment based on at least one of a centralized trust topology or a diffuse trust topology. The distributed transaction processing node of claim 1 also includes a trusted execution environment to protect first data associated with a centralized trust topology and to protect second data associated with a diffuse trust topology. The distributed transaction processing node of claim 1 further includes a trust topology selector to selectively configure the distributed transaction application to use the at least one of the centralized trust topology or the diffuse trust topology to process the transaction.

Example 2 includes the subject matter of example 1, wherein the trust topology selector includes a transaction migrator to determine a first trust value associated with the centralized trust topology, determine a second trust value associated with the diffuse trust topology, and determine whether the distributed transaction application is to use the at least one of the centralized trust topology or the diffuse trust topology based on the first trust value and the second trust value.

Example 3 includes the subject matter of example 2, wherein the transaction migrator is to configure the distributed transaction application to use the centralized trust topology when the first trust value exceeds the second trust value, and configure the distributed transaction application to use the diffuse trust topology when the second trust value exceeds the first trust value.

Example 4 includes the subject matter of example 3, wherein when the first trust value matches the second trust value, the transaction migrator is further to configure the distributed transaction application to use the centralized trust topology when a first quality of service value associated with the centralized trust topology exceeds a second quality of service value associated with the diffuse trust topology, and configure the distributed transaction application to use the diffuse trust topology when the second quality of service value associated with the diffuse trust topology exceeds the first quality of service value associated with the centralized trust topology.

Example 5 includes the subject matter of any one of examples 1 to 4, wherein the trust topology selector includes a trust threshold analyzer to monitor telemetry data associated with operation of the distributed transaction processing node to determine whether to isolate the distributed transaction processing node from the centralized trust topology, and configure the distributed transaction application to use the diffuse trust topology in response to determining that the distributed transaction processing node is to be isolated from the centralized trust topology.

Example 6 includes the subject matter of any one of examples 1 to 5, wherein the trust topology selector includes an attestation verifier to perform peer attestations with other distributed transaction processing nodes based on a whitelist provided by a centralized trust authority, and report results of the peer attestations to a blockchain associated with the diffuse trust topology to determine whether the distributed transaction processing node is to be isolated from the centralized trust topology.

Example 7 includes the subject matter of any one of examples 1 to 6, wherein the first data includes first cryptographic key data associated with the centralized trust topology, and the second data includes second cryptographic key data and blockchain data associated with the diffuse trust topology.

Example 8 includes one or more non-transitory computer readable storage media including computer readable instructions which, when executed, cause one or more processors to at least (i) execute a distributed transaction application to process a transaction in a computing environment based on at least one of a centralized trust topology or a diffuse trust topology, (ii) implement a trusted execution environment to protect first data associated with a centralized trust topology and to protect second data associated with a diffuse trust topology, and (iii) selectively configure the distributed transaction application to use the at least one of the centralized trust topology or the diffuse trust topology to process the transaction.

Example 9 includes the subject matter of example 8, wherein to configure the distributed transaction application, the instructions cause the one or more processors to determine a first trust value associated with the centralized trust topology, determine a second trust value associated with the diffuse trust topology, and determine whether the distributed transaction application is to use the at least one of the centralized trust topology or the diffuse trust topology based on the first trust value and the second trust value.

Example 10 includes the subject matter of example 9, wherein to configure the distributed transaction application, the instructions further cause the one or more processors to configure the distributed transaction application to use the centralized trust topology when the first trust value exceeds the second trust value, and configure the distributed transaction application to use the diffuse trust topology when the second trust value exceeds the first trust value.

Example 11 includes the subject matter of example 10, wherein when the first trust value matches the second trust value, the instructions further cause the one or more processors to configure the distributed transaction application to use the centralized trust topology when a first quality of service value associated with the centralized trust topology exceeds a second quality of service value associated with the diffuse trust topology, and configure the distributed transaction application to use the diffuse trust topology when the second quality of service value associated with the diffuse trust topology exceeds the first quality of service value associated with the centralized trust topology.

Example 12 includes the subject matter of any one of examples 8 to 11, wherein the one or more processors are associated with a distributed transaction processing node, and to configure the distributed transaction application, the instructions cause the one or more processors to monitor telemetry data associated with operation of the distributed transaction processing node to determine whether to isolate the distributed transaction processing node from the centralized trust topology, and configure the distributed transaction application to use the diffuse trust topology in response to determining that the distributed transaction processing node is to be isolated from the centralized trust topology.

Example 13 includes the subject matter of any one of examples 8 to 12, wherein the one or more processors are associated with a distributed transaction processing node, and the instructions cause the one or more processors to perform peer attestations with other distributed transaction processing nodes based on a whitelist provided by a centralized trust authority, and report results of the peer attestations to a blockchain associated with the diffuse trust topology to determine whether the distributed transaction processing node is to be isolated from the centralized trust topology.

Example 14 includes the subject matter of any one of examples 8 to 13, wherein the first data includes first cryptographic key data associated with the centralized trust topology, and the second data includes second cryptographic key data and blockchain data associated with the diffuse trust topology.

Example 15 is an apparatus to perform trust topology selection for distributed transaction processing. The apparatus of claim 15 includes transaction processing means for processing a transaction in a computing environment based on at least one of a centralized trust topology or a diffuse trust topology. The apparatus of claim 15 also includes data protection means for protecting first data associated with a centralized trust topology and for protecting second data associated with a diffuse trust topology. The apparatus of claim 15 further includes topology selection means for selectively configuring whether the at least one of the centralized trust topology or the diffuse trust topology is to be used by the transaction processing means to process the transaction.

Example 16 includes the subject matter of example 15, wherein the topology selection means is to determine a first trust value associated with the centralized trust topology, determine a second trust value associated with the diffuse trust topology, and determine whether the transaction processing means is to use the at least one of the centralized trust topology or the diffuse trust topology based on the first trust value and the second trust value.

Example 17 includes the subject matter of example 16, wherein the topology selection means is further to configure the transaction processing means to use the centralized trust topology when the first trust value exceeds the second trust value, and configure the transaction processing means to use the diffuse trust topology when the second trust value exceeds the first trust value.

Example 18 includes the subject matter of example 17, wherein when the first trust value matches the second trust value, the topology selection means is further to configure the transaction processing means to use the centralized trust topology when a first quality of service value associated with the centralized trust topology exceeds a second quality of service value associated with the diffuse trust topology, and configure the transaction processing means to use the diffuse trust topology when the second quality of service value associated with the diffuse trust topology exceeds the first quality of service value associated with the centralized trust topology.

Example 19 includes the subject matter of any one of examples 15 to 18, wherein the apparatus is associated with a distributed transaction processing node, and the topology selection means includes means for monitoring telemetry data associated with operation of the distributed transaction processing node to determine whether to isolate the distributed transaction processing node from the centralized trust topology, and for configuring the transaction processing means to use the diffuse trust topology in response to determining that the distributed transaction processing node is to be isolated from the centralized trust topology.

Example 20 includes the subject matter of any one of examples 15 to 19, wherein the apparatus is associated with a distributed transaction processing node, and the topology selection means includes means for performing peer attestations with other distributed transaction processing nodes based on a whitelist provided by a centralized trust authority, and for reporting results of the peer attestations to a blockchain associated with the diffuse trust topology to determine whether the distributed transaction processing node is to be isolated from the centralized trust topology.

Example 21 includes the subject matter of example 20, and further includes means for evaluating the results of the peer attestations reported to the blockchain associated with the diffuse trust topology to determine whether to revalidate whether the distributed transaction processing node is to participate in the centralized trust topology, and means for provisioning an update whitelist to allow the distributed transaction processing node to resume participation in the centralized trust topology.

Example 22 includes the subject matter of example 20, and further includes means for evaluating the blockchain associated with the diffuse trust topology to determine effectiveness of an attestation technique used to perform the peer attestations.

Example 23 includes the subject matter of any one of examples 15 to 22, wherein the first data includes first cryptographic key data associated with the centralized trust topology, and the second data includes second cryptographic key data and blockchain data associated with the diffuse trust topology.

Example 24 is a method to perform trust topology selection for distributed transaction processing. The method of example 24 include executing a distributed transaction application to process a transaction in a computing environment based on at least one of a centralized trust topology or a diffuse trust topology. The method of example 24 also includes implementing a trusted execution environment to protect first data associated with a centralized trust topology and to protect second data associated with a diffuse trust topology. The method of example 24 further includes selectively configuring, by executing an instruction with a processor, the distributed transaction application to use the at least one of the centralized trust topology or the diffuse trust topology to process the transaction.

Example 25 includes the subject matter of example 24, wherein the configuring of the distributed transaction application includes determining a first trust value associated with the centralized trust topology, determining a second trust value associated with the diffuse trust topology, and determining whether the distributed transaction application is to use the at least one of the centralized trust topology or the diffuse trust topology based on the first trust value and the second trust value.

Example 26 includes the subject matter of example 25, wherein the configuring of the distributed transaction application further includes configuring the distributed transaction application to use the centralized trust topology when the first trust value exceeds the second trust value, and configuring the distributed transaction application to use the diffuse trust topology when the second trust value exceeds the first trust value. In some examples, the method of example 26 also includes, when the first trust value matches the second trust value, configuring the distributed transaction application to use the centralized trust topology when a first quality of service value associated with the centralized trust topology exceeds a second quality of service value associated with the diffuse trust topology, and configuring the distributed transaction application to use the diffuse trust topology when the second quality of service value associated with the diffuse trust topology exceeds the first quality of service value associated with the centralized trust topology.

Example 27 includes the subject matter of any one of examples 24 to 26, wherein the processor is associated with a distributed transaction processing node, and the configuring of the distributed transaction application includes monitoring telemetry data associated with operation of the distributed transaction processing node to determine whether to isolate the distributed transaction processing node from the centralized trust topology, and configuring the distributed transaction application to use the diffuse trust topology in response to determining that the distributed transaction processing node is to be isolated from the centralized trust topology.

Example 28 includes the subject matter of example 27, wherein the transaction is a first transaction, and after the configuring of the distributed transaction application to use the diffuse trust topology, the distributed transaction application is to use the diffuse trust topology to process transactions, including the first transaction, at a slower transaction processing rate than is achievable when using the centralized trust topology for transaction processing.

Example 29 includes the subject matter of any one of examples 24 to 28, wherein the processor is associated with a distributed transaction processing node, and further including performing peer attestations with other distributed transaction processing nodes based on a whitelist provided by a centralized trust authority, and reporting results of the peer attestations to a blockchain associated with the diffuse trust topology to determine whether the distributed transaction processing node is to be isolated from the centralized trust topology.

Example 30 includes the subject matter of any one of examples 24 to 29, wherein the first data includes first cryptographic key data associated with the centralized trust topology, and the second data includes second cryptographic key data and blockchain data associated with the diffuse trust topology.

Example 31 includes one or more computer readable storage media including computer readable instructions which, when executed, cause one or more processors to perform the method of any one of examples 24 to 30.

Example 32 is an apparatus including one or more processors to perform the method of any one of examples 24 to 30.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A distributed transaction processing node comprising:
    a distributed transaction application to process a transaction in a computing environment based on at least one of a centralized trust topology or a diffuse trust topology;
    a trusted execution environment to protect first data associated with a centralized trust topology and to protect second data associated with a diffuse trust topology; and
    a trust topology selector at least partially implemented with at least one of circuitry or at least one processor, the trust topology selector to:
        determine a first trust value associated with the centralized trust topology;
        determine a second trust value associated with the diffuse trust topology;
        configure the distributed transaction application to use the centralized trust topology to process the transaction when the first trust value exceeds the second trust value; and
        configure the distributed transaction application to use the diffuse trust topology to process the transaction when the second trust value exceeds the first trust value.

2. The distributed transaction processing node of claim 1, wherein when the first trust value matches the second trust value, the trust topology selector is further to:
    configure the distributed transaction application to use the centralized trust topology when a first quality of service value associated with the centralized trust topology exceeds a second quality of service value associated with the diffuse trust topology; and
    configure the distributed transaction application to use the diffuse trust topology when the second quality of service value associated with the diffuse trust topology exceeds the first quality of service value associated with the centralized trust topology.

3. The distributed transaction processing node of claim 1, wherein the trust topology selector is to:
    perform peer attestations with other distributed transaction processing nodes based on a whitelist provided by a centralized trust authority; and
    report results of the peer attestations to a blockchain associated with the diffuse trust topology to determine whether the distributed transaction processing node is to be isolated from the centralized trust topology.

4. The distributed transaction processing node of claim 1, wherein the distributed transaction processing node is implemented by at least one of a mobile phone, a tablet device, a drone or an autonomous vehicle.

5. A distributed transaction processing node comprising:
    a distributed transaction application to process a transaction in a computing environment based on at least one of a centralized trust topology or a diffuse trust topology;
    a trusted execution environment to protect first data associated with a centralized trust topology and to protect second data associated with a diffuse trust topology; and
    a trust topology selector at least partially implemented with at least one of circuitry or at least one processor, the trust topology selector to:
        selectively configure the distributed transaction application to use the at least one of the centralized trust topology or the diffuse trust topology to process the transaction;
        monitor telemetry data associated with operation of the distributed transaction processing node to determine whether to isolate the distributed transaction processing node from the centralized trust topology; and
        configure the distributed transaction application to use the diffuse trust topology in response to determining that the distributed transaction processing node is to be isolated from the centralized trust topology.

6. The distributed transaction processing node of claim 5, wherein the trust topology selector is to:
   perform peer attestations with other distributed transaction processing nodes based on a whitelist provided by a centralized trust authority; and
   report results of the peer attestations to a blockchain associated with the diffuse trust topology to determine whether the distributed transaction processing node is to be isolated from the centralized trust topology.

7. The distributed transaction processing node of claim 5, wherein the distributed transaction processing node is implemented by at least one of a mobile phone, a tablet device, a drone or an autonomous vehicle.

8. One or more non-transitory computer readable storage media comprising computer readable instructions which, when executed, cause one or more processors to at least:
   execute a distributed transaction application to process a transaction in a computing environment based on at least one of a centralized trust topology or a diffuse trust topology;
   implement a trusted execution environment to protect first data associated with a centralized trust topology and to protect second data associated with a diffuse trust topology;
   determine a first trust value associated with the centralized trust topology;
   determine a second trust value associated with the diffuse trust topology;
   configure the distributed transaction application to use the centralized trust topology to process the transaction when the first trust value exceeds the second trust value; and
   configure the distributed transaction application to use the diffuse trust topology to process the transaction when the second trust value exceeds the first trust value.

9. The one or more storage media of claim 8, wherein when the first trust value matches the second trust value, the instructions further cause the one or more processors to:
   configure the distributed transaction application to use the centralized trust topology when a first quality of service value associated with the centralized trust topology exceeds a second quality of service value associated with the diffuse trust topology; and
   configure the distributed transaction application to use the diffuse trust topology when the second quality of service value associated with the diffuse trust topology exceeds the first quality of service value associated with the centralized trust topology.

10. The one or more storage media of claim 8, wherein the one or more processors are associated with a distributed transaction processing node, and the instructions cause the one or more processors to:
    perform peer attestations with other distributed transaction processing nodes based on a whitelist provided by a centralized trust authority; and
    report results of the peer attestations to a blockchain associated with the diffuse trust topology to determine whether the distributed transaction processing node is to be isolated from the centralized trust topology.

11. The one or more storage media of claim 8, wherein the one or more processors are included in at least one of a mobile phone, a tablet device, a drone or an autonomous vehicle.

12. One or more non-transitory computer readable storage media comprising computer readable instructions which, when executed, cause one or more processors associated with a distributed transaction processing node to at least:
    execute a distributed transaction application to process a transaction in a computing environment based on at least one of a centralized trust topology or a diffuse trust topology;
    implement a trusted execution environment to protect first data associated with a centralized trust topology and to protect second data associated with a diffuse trust topology;
    selectively configure the distributed transaction application to use the at least one of the centralized trust topology or the diffuse trust topology to process the transaction;
    monitor telemetry data associated with operation of the distributed transaction processing node to determine whether to isolate the distributed transaction processing node from the centralized trust topology; and
    configure the distributed transaction application to use the diffuse trust topology in response to determining that the distributed transaction processing node is to be isolated from the centralized trust topology.

13. The one or more storage media of claim 12, wherein the instructions cause the one or more processors to:
    perform peer attestations with other distributed transaction processing nodes based on a whitelist provided by a centralized trust authority; and
    report results of the peer attestations to a blockchain associated with the diffuse trust topology to determine whether the distributed transaction processing node is to be isolated from the centralized trust topology.

14. The one or more storage media of claim 12, wherein the one or more processors are included in at least one of a mobile phone, a tablet device, a drone or an autonomous vehicle.

15. An apparatus to perform trust topology selection for distributed transaction processing, the apparatus comprising:
    transaction processing means for processing a transaction in a computing environment based on at least one of a centralized trust topology or a diffuse trust topology;
    data protection means for protecting first data associated with a centralized trust topology and for protecting second data associated with a diffuse trust topology; and
    topology selection means for selectively configuring whether the at least one of the centralized trust topology or the diffuse trust topology is to be used by the transaction processing means to process the transaction, the topology selection means is further to:
      determine a first trust value associated with the centralized trust topology;
      determine a second trust value associated with the diffuse trust topology;
      configure the transaction processing means to use the centralized trust topology to process the transaction when the first trust value exceeds the second trust value; and
      configure the transaction processing means to use the diffuse trust topology to process the transaction when the second trust value exceeds the first trust value.

16. The apparatus of claim 15, wherein when the first trust value matches the second trust value, the topology selection means is further to:
    configure the transaction processing means to use the centralized trust topology when a first quality of service value associated with the centralized trust topology exceeds a second quality of service value associated with the diffuse trust topology; and configure the transaction processing means to use the diffuse trust topology when the second quality of service value associated with the diffuse trust topology exceeds the first quality of service value associated with the centralized trust topology.

17. The apparatus of claim 15, wherein the apparatus is associated with a distributed transaction processing node, and the topology selection means is to:

perform peer attestations with other distributed transaction processing nodes based on a whitelist provided by a centralized trust authority; and report results of the peer attestations to a blockchain associated with the diffuse trust topology to determine whether the distributed transaction processing node is to be isolated from the centralized trust topology.

18. The apparatus of claim 17, further including:

means for evaluating the results of the peer attestations reported to the blockchain associated with the diffuse trust topology to determine whether to revalidate whether the distributed transaction processing node is to participate in the centralized trust topology; and means for provisioning an update whitelist to allow the distributed transaction processing node to resume participation in the centralized trust topology.

19. The apparatus of claim 17, further including means for evaluating the blockchain associated with the diffuse trust topology to determine effectiveness of an attestation technique used to perform the peer attestations.

20. The apparatus of claim 15, wherein the apparatus is included in at least one of a mobile phone, a tablet device, a drone or an autonomous vehicle.

21. An apparatus of to perform trust topology selection for distributed transaction processing associated with a distributed transaction processing node, the apparatus comprising:

transaction processing means for processing a transaction in a computing environment based on at least one of a centralized trust topology or a diffuse trust topology;

data protection means for protecting first data associated with a centralized trust topology and for protecting second data associated with a diffuse trust topology; and topology selection means for selectively configuring whether the at least one of the centralized trust topology or the diffuse trust topology is to be used by the transaction processing means to process the transaction, the topology selection means to:

monitor telemetry data associated with operation of the distributed transaction processing node to determine whether to isolate the distributed transaction processing node from the centralized trust topology; and configure the transaction processing means to use the diffuse trust topology in response to determining that the distributed transaction processing node is to be isolated from the centralized trust topology.

22. The apparatus of claim 21, wherein the topology selection means is to:

perform peer attestations with other distributed transaction processing nodes based on a whitelist provided by a centralized trust authority; and report results of the peer attestations to a blockchain associated with the diffuse trust topology to determine whether the distributed transaction processing node is to be isolated from the centralized trust topology.

23. The apparatus of claim 21, wherein the apparatus is included in at least one of a mobile phone, a tablet device, a drone or an autonomous vehicle.

24. A method to perform trust topology selection for distributed transaction processing, the method comprising:

executing a distributed transaction application to process a transaction in a computing environment based on at least one of a centralized trust topology or a diffuse trust topology;

implementing a trusted execution environment to protect first data associated with a centralized trust topology and to protect second data associated with a diffuse trust topology;

determining a first trust value associated with the centralized trust topology;

determining a second trust value associated with the diffuse trust topology;

configuring, by executing an instruction with a processor, the distributed transaction application to use the centralized trust topology to process the transaction when the first trust value exceeds the second trust value;

configuring, by executing an instruction with the processor, the distributed transaction application to use the diffuse trust topology to process the transaction when the second trust value exceeds the first trust value; and when the first trust value matches the second trust value:

configuring the distributed transaction application to use the centralized trust topology when a first quality of service value associated with the centralized trust topology exceeds a second quality of service value associated with the diffuse trust topology; and configuring the distributed transaction application to use the diffuse trust topology when the second quality of service value associated with the diffuse trust topology exceeds the first quality of service value associated with the centralized trust topology.

25. The method of claim 24, wherein the processor is included in at least one of a mobile phone, a tablet device, a drone or an autonomous vehicle.

26. A method to perform trust topology selection for distributed transaction processing associated with a distributed transaction processing node, the method comprising:

executing a distributed transaction application to process a transaction in a computing environment based on at least one of a centralized trust topology or a diffuse trust topology;

implementing a trusted execution environment to protect first data associated with a centralized trust topology and to protect second data associated with a diffuse trust topology; and selectively configuring, by executing an instruction with a processor, the distributed transaction application to use the at least one of the centralized trust topology or the diffuse trust topology to process the transaction;

monitoring telemetry data associated with operation of the distributed transaction processing node to determine whether to isolate the distributed transaction processing node from the centralized trust topology; and configuring the distributed transaction application to use the diffuse trust topology in response to determining that the distributed transaction processing node is to be isolated from the centralized trust topology.

27. The method of claim 26, wherein the transaction is a first transaction, and after the configuring of the distributed transaction application to use the diffuse trust topology, the distributed transaction application is to use the diffuse trust topology to process transactions, including the first transaction, at a slower transaction processing rate than is achievable when using the centralized trust topology for transaction processing.

28. The method of claim 26, wherein the processor is included in at least one of a mobile phone, a tablet device, a drone or an autonomous vehicle.

* * * * *